(12) United States Patent
Horita et al.

(10) Patent No.: US 11,557,103 B2
(45) Date of Patent: Jan. 17, 2023

(54) STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Junpei Horita, Kyoto (JP); Masahiro Nitta, Kyoto (JP); Kazuyoshi Sensui, Kyoto (JP); Yasuharu Ohta, Kyoto (JP); Junki Uosawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/527,731

(22) Filed: Nov. 16, 2021

(65) Prior Publication Data

US 2022/0157029 A1    May 19, 2022

(30) Foreign Application Priority Data

Nov. 18, 2020   (JP) .............................. JP2020-191511

(51) Int. Cl.
*G06T 19/00* (2011.01)
*G06T 7/80* (2017.01)
*G06T 7/70* (2017.01)
*G06V 20/20* (2022.01)

(52) U.S. Cl.
CPC .............. *G06T 19/006* (2013.01); *G06T 7/70* (2017.01); *G06T 7/80* (2017.01); *G06V 20/20* (2022.01); *G06T 2207/30244* (2013.01)

(58) Field of Classification Search
CPC ........... G06T 19/006; G06T 7/70; G06T 7/80; G06T 2207/30244; G06T 2219/2016; G06T 15/20; G06T 19/20; G06V 20/20
See application file for complete search history.

(56) References Cited

U.S. PATENT DOCUMENTS

| 7,911,468 | B2 * | 3/2011 | Ajioka | A63F 13/10 |
| | | | | 345/474 |
| 9,278,281 | B2 * | 3/2016 | Ito | A63F 13/10 |
| 9,566,509 | B2 * | 2/2017 | Paquet | A63F 13/65 |

(Continued)

FOREIGN PATENT DOCUMENTS

JP    2014-071877 A    4/2014

*Primary Examiner* — Motilewa Good-Johnson
(74) *Attorney, Agent, or Firm* — Scully, Scott, Murphy & Presser, P.C.

(57) ABSTRACT

A virtual reference plane and a virtual camera are updated based on detection of a characteristic portion in a captured image. A virtual object and the virtual camera are updated based on a shooting state. An overlay image in which an image of the virtual object is overlaid on the captured image is generated. The virtual camera and the virtual object are controlled such that the virtual object is in a field-of-view range, before the detection of the characteristic portion. The virtual object, the virtual reference plane, and the virtual camera are updated such that the virtual object is along the virtual reference plane, based on the shooting state, after the detection of the characteristic portion, and such that an appearance of the virtual object is in association with the shooting state, no matter whether or not the characteristic portion has been detected, when a position fixation condition is satisfied.

14 Claims, 16 Drawing Sheets

(56) References Cited

U.S. PATENT DOCUMENTS

| | | | |
|---|---|---|---|
| 10,475,248 B1 | 11/2019 | Klein et al. | |
| 10,569,173 B2 * | 2/2020 | Tsutsui | A63F 13/5252 |
| 10,744,410 B2 * | 8/2020 | Hayami | A63F 13/57 |
| 11,402,655 B2 * | 8/2022 | Iwata | H04N 13/366 |
| 11,436,820 B2 * | 9/2022 | Harrison | G06F 30/20 |
| 2011/0304703 A1 * | 12/2011 | Ito | G06T 19/006 |
| | | | 348/47 |
| 2012/0007882 A1 * | 1/2012 | Sakurai | G06F 3/04883 |
| | | | 345/619 |
| 2012/0075285 A1 * | 3/2012 | Oyagi | A63F 13/65 |
| | | | 345/419 |
| 2012/0075424 A1 * | 3/2012 | Kawamoto | H04N 13/239 |
| | | | 348/46 |
| 2012/0077582 A1 * | 3/2012 | Noge | A63F 13/53 |
| | | | 463/43 |
| 2012/0113228 A1 * | 5/2012 | Konno | H04N 13/356 |
| | | | 348/47 |
| 2012/0176409 A1 * | 7/2012 | Noge | A63F 13/5255 |
| | | | 345/633 |
| 2012/0219179 A1 * | 8/2012 | Osako | G06T 7/20 |
| | | | 382/103 |
| 2014/0092133 A1 * | 4/2014 | Hayakawa | G06T 19/006 |
| | | | 345/633 |
| 2019/0197779 A1 | 6/2019 | Avramov et al. | |
| 2020/0265638 A1 | 8/2020 | Koperwas et al. | |
| 2020/0302681 A1 * | 9/2020 | Totty | G06T 7/74 |
| 2022/0157029 A1 * | 5/2022 | Horita | G06T 19/006 |
| 2022/0191431 A1 * | 6/2022 | Oz | H04N 7/157 |
| 2022/0254125 A1 * | 8/2022 | Koch | G06F 3/011 |

\* cited by examiner

F I G. 1 4
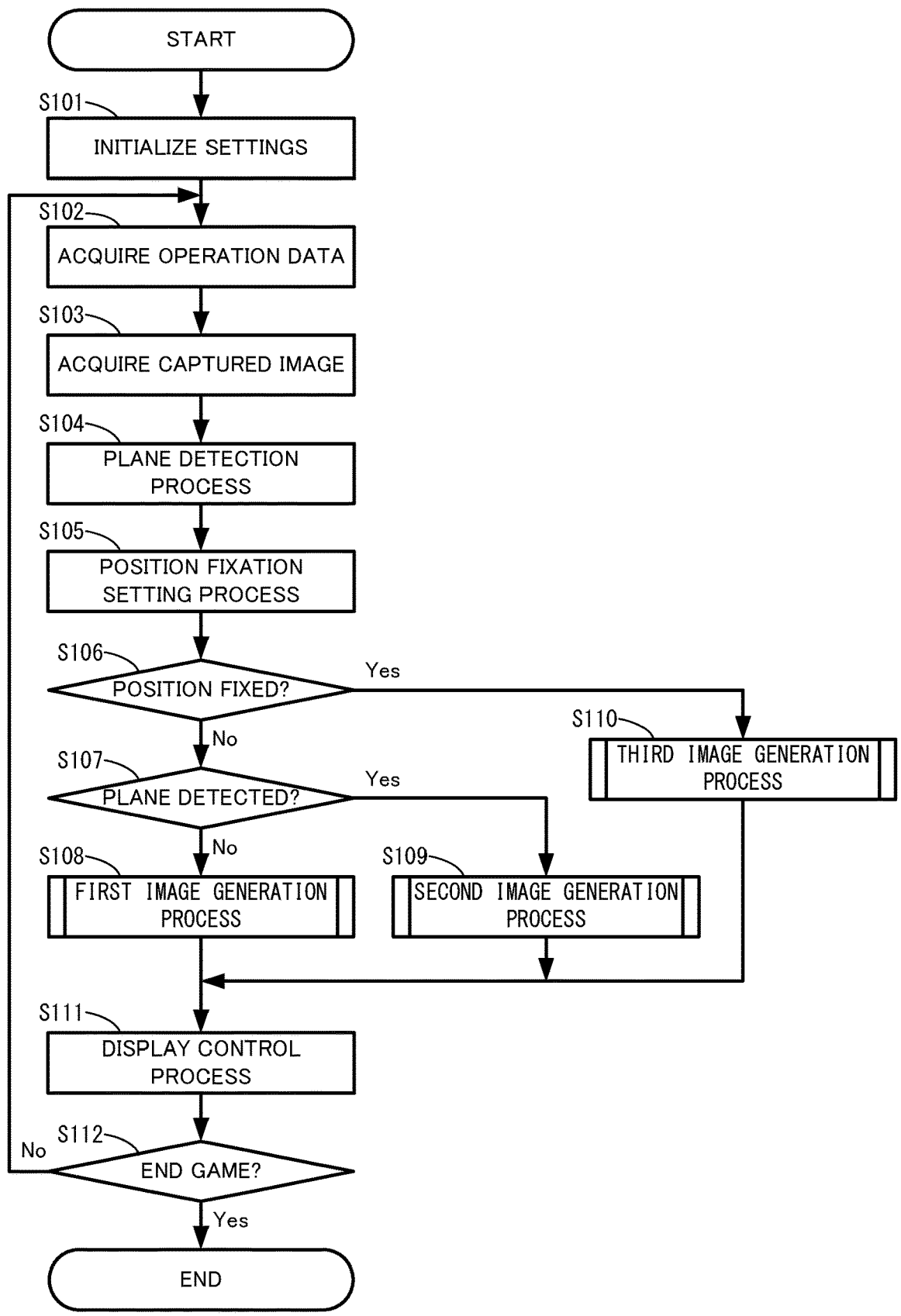

F I G. 1 5
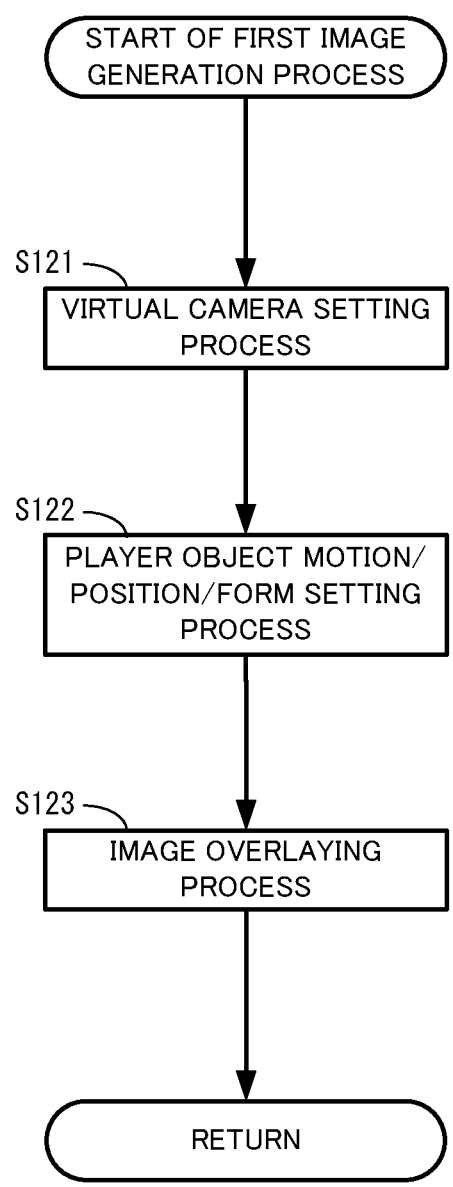

STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

This application claims priority to Japanese Patent Application No. 2020-191511, filed on Nov. 18, 2020, the entire contents of which are incorporated herein by reference.

FIELD

The technology disclosed herein relates to storage media storing an information processing program, information processing apparatuses, information processing systems, and information processing methods, and more particularly, to a storage medium storing an information processing program, information processing apparatus, information processing system, and information processing method that perform a process of displaying a captured image of a real space with an image of a virtual object overlaid on the captured image.

BACKGROUND AND SUMMARY

There is a conventional image processing device that captures an image of a real space, and in the captured image, detects a marker provided in the real space, and thereafter, displays the captured image with a virtual object overlaid on the captured image according to display reference information based on the marker.

However, such an image processing device cannot dispose a virtual object in a virtual space to overlay and display the virtual object on the captured image, until a characteristic portion (marker) is detected in the captured image.

With this in mind, it is an object of this non-limiting example to provide a storage medium storing an information processing program, information processing apparatus, information processing system, and information processing method that are capable of reducing the response time that it takes to overlay and display a virtual object on a captured image of a real space.

To achieve the object, this non-limiting example has the following features, for example.

In a non-limiting example configuration of a non-transitory computer-readable storage medium having stored therein an information processing program of this non-limiting example, a non-transitory computer-readable storage medium having stored therein instructions that, when executed by a computer of an information processing apparatus, cause the information processing apparatus to perform operations comprising: detecting a shooting state including a position and an orientation of an imaging device that generates a captured image of a real space at update intervals; first updating a position and an orientation of at least one of a virtual reference plane and a virtual camera in a virtual space, based on detection of a characteristic portion in the captured image; second updating a position and an orientation of at least one of a virtual object and the virtual camera in the virtual space, based on the shooting state; generating an overlay image in which an image of the virtual object as viewed from the virtual camera is overlaid on the captured image, when the virtual object is in a field-of-view range of the virtual camera; and outputting the overlay image to a display device, wherein the second updating includes controlling the position and orientation of at least one of the virtual camera and the virtual object such that the virtual object is in the field-of-view range of the virtual camera, before the detection of the characteristic portion, updating the position of at least one of the virtual object, the virtual reference plane, and the virtual camera such that the virtual object is along the virtual reference plane, based on the shooting state, after the detection of the characteristic portion, and updating the position and orientation of at least one of the virtual object, the virtual reference plane, and the virtual camera such that an appearance of the virtual object as viewed from the virtual camera based on relative orientations and relative positions of the virtual camera and the virtual object is in association with the shooting state, no matter whether or not the characteristic portion has been detected, when a position fixation condition is satisfied.

Thus, the virtual object can be overlaid and displayed on the captured image, even before the characteristic portion has been detected in the captured image. Therefore, the response time that it takes to overlay and display the virtual object can be reduced.

Further, the first updating may include updating the position and orientation of at least one of the virtual reference plane and the virtual camera, based on the detection of the characteristic portion indicating a plane in the real space in the captured image, such that a position and an orientation of the plane correspond to the position and orientation of the virtual reference plane in the overlay image.

Therefore, the virtual object can be overlaid and displayed using a plane whose image is captured in the captured image.

Further, the second updating may include updating the orientation of at least one of the virtual object and the virtual camera, according to the orientation of the imaging device, before the detection of the characteristic portion.

Therefore, the appearance of the virtual object can be changed by moving the imaging device, even before the characteristic portion has been detected in the captured image.

Further, the second updating may include disposing a shadow object indicating a shadow of the virtual object on the virtual reference plane, after the detection of the characteristic portion.

Therefore, by overlaying and displaying the shadow object, the user can be notified of the presence of the virtual reference plane set based on the characteristic portion. Also, by overlaying and displaying the shadow object, the user can be notified that the virtual object is disposed along the virtual reference plane.

Further, the second updating may include, when the position fixation condition is satisfied, updating the position of at least one of the virtual object and the virtual camera, in response to changing of the position of the imaging device by a first change amount, such that relative positions of the virtual camera and the virtual object are changed by a second change amount proportional to the first change amount, no matter whether or not the characteristic portion has been detected.

Thus, the position is changed according to the scale ratio of the real space and the virtual space. Therefore, the overlay image can represent a scene that the virtual object and the virtual camera are moved in the virtual space in a manner similar to that in which the imaging device is moved in the real space.

Further, the second updating may include, when the position fixation condition is satisfied, updating the orientation of at least one of the virtual object and the virtual camera, in response to changing of the orientation of the imaging device by a third change amount, such that a relative direction between a direction of the orientation of the virtual camera and a direction from the virtual camera to the virtual object is changed by a third change amount, no matter whether or not the characteristic portion has been detected.

Therefore, the overlay image can represent a scene that the orientations of the virtual object and the virtual camera are changed in the virtual space by the same change amount that the orientation of the imaging device is changed in the real space.

Further, in the second updating, display forms of the virtual object before and after the position fixation condition is satisfied may be different from each other.

Therefore, the user can be notified of whether or not the position fixation condition is satisfied.

Further, in the second updating, display forms of the virtual object before and after the detection of the characteristic portion may be different from each other.

Therefore, the user can be notified of whether or not the characteristic portion has been detected in the captured image.

Further, the instructions may cause the computer to perform further operations comprising: changing an action of the virtual object according to a first instruction input of a user.

Therefore, more various operations can be performed by the user.

Further, the second updating may include turning the virtual object around an axis perpendicular to the virtual reference plane, or turning the virtual camera around an axis passing through the position of the virtual object and extending perpendicularly to the virtual reference plane, according to a second instruction input of a user, after the position fixation condition is satisfied.

Therefore, the orientation of the virtual object overlaid and displayed can be further changed according to the user's operation.

Further, the first updating may include updating the position and orientation of the virtual camera, based on the detection of the characteristic portion in the captured image, and the second updating may include, when the position fixation condition is satisfied, updating the position and orientation of the virtual camera such that the position and orientation of the virtual camera are in association with the shooting state, no matter whether or not the characteristic portion has been detected.

Thus, the virtual camera is moved in the virtual space in association with the movement of the imaging device in the real space. Therefore, the user can feel as if the virtual object were in the real space. In addition, the control of the virtual camera is facilitated.

Further, this non-limiting example may be carried out in the form of an information processing apparatus, information processing system, and information processing method.

In this non-limiting example, the response time that it takes to overlay and display the virtual object in the captured image can be reduced.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 14 is a flowchart illustrating a non-limiting example of a process that is executed in the information processing apparatus 3, FIG. 15 is a subroutine illustrating a detailed non-limiting example of a first image generation process in step S108 of FIG. 14.

DETAILED DESCRIPTION OF NON-LIMITING EXAMPLE EMBODIMENTS

An information processing system according to this non-limiting example will be described with reference to FIG. 1.

Figure 1:
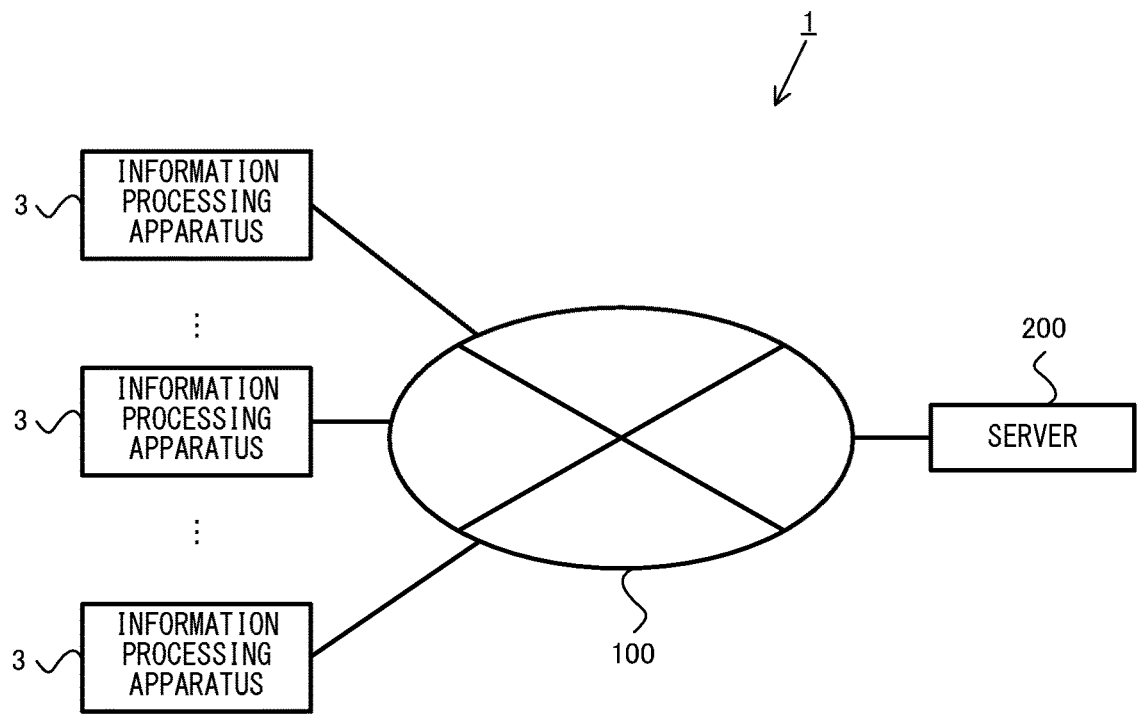
FIG. 1 is a diagram illustrating a non-limiting example of an information processing system 1 according to this non-limiting example.

As illustrated in FIG. 1, an information processing system 1 that is a non-limiting example of the information processing system of the non-limiting example, includes information processing apparatuses 3 and a server 200, which are connected together through a network 100. Although FIG. 1 illustrates a plurality of information processing apparatuses 3, the information processing system 1 may include only a single information processing apparatus 3.

The information processing apparatuses 3 are configured to be able to connect to the network 100 through wireless or wired communication. The information processing apparatuses 3 and the server 200 constitute a client-server system. For example, the information processing apparatuses 3 can execute a predetermined application (e.g., a game application, etc.). The information processing apparatuses 3 can connect to and communicate with the server 200 through the network 100 by executing the above predetermined application. For example, the information processing apparatuses 3 can execute an information processing program that is stored in a replaceable storage medium, such as a memory card or an optical disc, or is received from another apparatus. The information processing apparatuses 3 may be a typical personal computer, stationary game machine, mobile telephone (smartphone), handheld game console, personal digital assistant (PDA), etc. At least one input device or display device may be provided separately from the main body.

Figure 2:
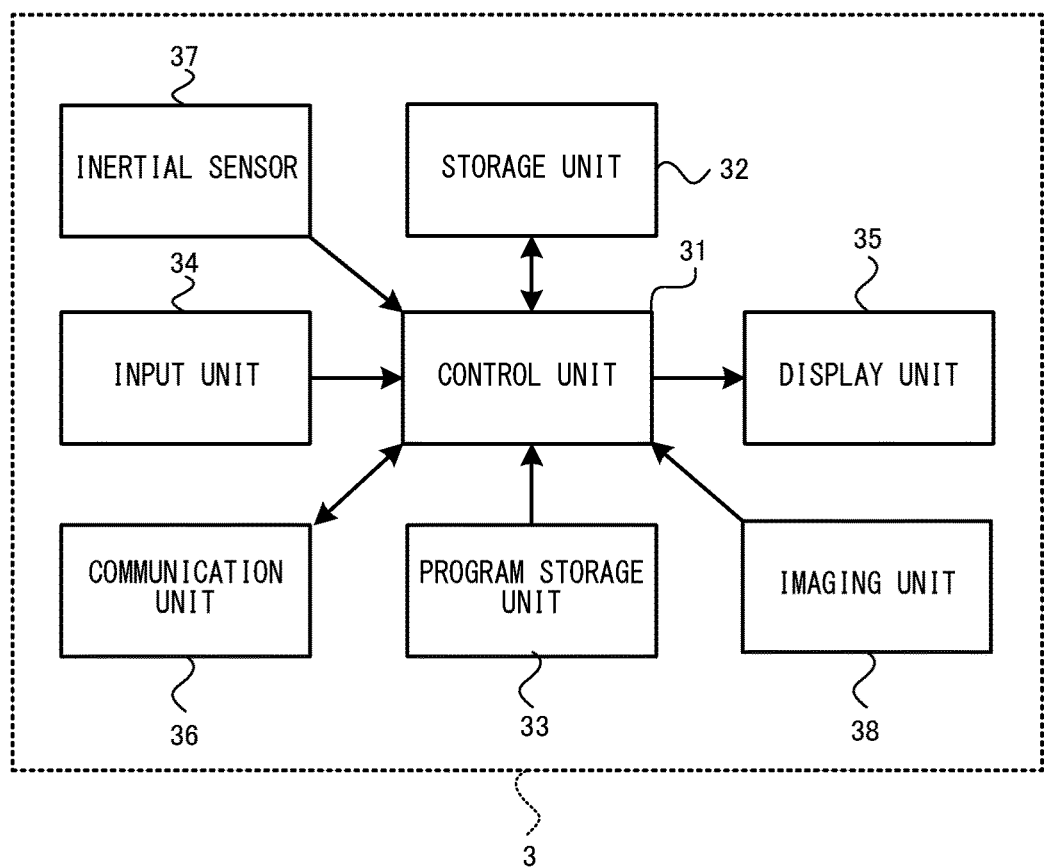
FIG. 2 is a block diagram illustrating a non-limiting example of a configuration of an information processing apparatus 3.

Next, the information processing apparatus 3 will be described with reference to FIG. 2. FIG. 2 is a block diagram illustrating a non-limiting example of a configuration of the information processing apparatus 3. In FIG. 2, the information processing apparatus 3 includes a control unit 31, a storage unit 32, a program storage unit 33, an input unit 34, a display unit 35, a communication unit 36, an inertial sensor 37, and an imaging unit 38. It should be noted that the information processing apparatus 3 may include one or more devices including an information processing device including at least the control unit 31, and other devices.

The control unit 31 is an information processing means (computer) for executing various information processes, such as a CPU. For example, the control unit 31 has a function of executing the above application to perform information processes such as a game process described below, and data transmission and reception processes through the server 200. This function is performed by the control unit 31 (e.g., a CPU) executing predetermined programs.

The storage unit 32 stores various items of data that are used when the control unit 31 executes the above information processes. The storage unit 32 is, for example, a memory that can be accessed by the control unit 31 (e.g., a CPU).

The program storage unit 33 stores programs. The program storage unit 33 may be any storage device (storage medium) that can be accessed by the control unit 31. For example, the program storage unit 33 may be a storage device that is provided in the information processing device including the control unit 31, or a storage medium that is removably attached to the information processing device including the control unit 31. The program storage unit 33 may be a storage device (e.g., a server, etc.) that is connected to the control unit 31 through a network. The control unit 31 (CPU) may read all or a portion of a game program into the storage unit 32 and execute the read program with appropriate timing.

The input unit 34 is an input device that can be operated by a user. The input unit 34 may be any suitable input device. As a non-limiting example, the input unit 34 may be a touch panel provided on a screen of the display unit 35. For example, the touch panel may be of any type. The touch panel may be either of a type that allows a multi-touch input (e.g., a capacitive type) or of a type that allows a single-touch input (e.g., a resistive type).

The display unit 35 displays an image according to an instruction from the control unit 31. It should be noted that when the information processing apparatus 3 is a stationary game apparatus or a personal computer, the display unit 35 may be separated from the information processing apparatus 3. In this non-limiting example, the display unit 35 includes a touchscreen provided with a touch panel (the input unit 34) at a surface thereof, and a rectangular display region and touch region that have a first and a second side, the first side being longer than the second side.

The communication unit 36, which is a predetermined communication module, exchanges data with another apparatus (e.g., the server 200) or another information processing apparatus 3 through the network 100.

The inertial sensor 37, which detects an orientation and motion of the main body of the information processing apparatus 3, includes, for example, an acceleration sensor and/or an angular velocity sensor. For example, the acceleration sensor detects the magnitudes of accelerations along three orthogonal axial directions of the information processing apparatus 3 (the display unit 35). It should be noted that the acceleration sensor may detect an acceleration along one or two axial directions. The angular velocity sensor detects angular velocities about the three axes. It should be noted that the angular velocity sensor may detect an angular velocity about one or two axes. The inertial sensor 37 is connected to the control unit 31. A detection result of the acceleration sensor and/or angular velocity sensor is output to the control unit 31. Based on the detection result of the inertial sensor 37, the control unit 31 can calculate information about a motion and/or orientation of the information processing apparatus 3 (the display unit 35, the imaging unit 38), e.g., an orientation of the information processing apparatus 3 (the display unit 35, the imaging unit 38) in real space with respect to the direction of gravity.

At least one imaging unit 38 is provided on a back surface of the display unit 35 (an opposite surface from the surface on which the display unit 35 is provided). The imaging unit 38 serves as an imaging device (camera) built in the information processing apparatus 3. The shooting direction of the imaging unit 38 is the depth direction of the display screen of the display unit 35. The imaging unit 38 includes an imaging element having a predetermined resolution (e.g., a CCD image sensor or a CMOS image sensor), and a lens. The lens may have a zoom mechanism. The imaging unit 38, which is coupled to the control unit 31, captures an image of a real space in the shooting direction and outputs data of the captured image to the control unit 31 according to an instruction from the control unit 31. The control unit 31 can also cause the display unit 35 to immediately display the captured image acquired from the imaging unit 38.

Figure 3:
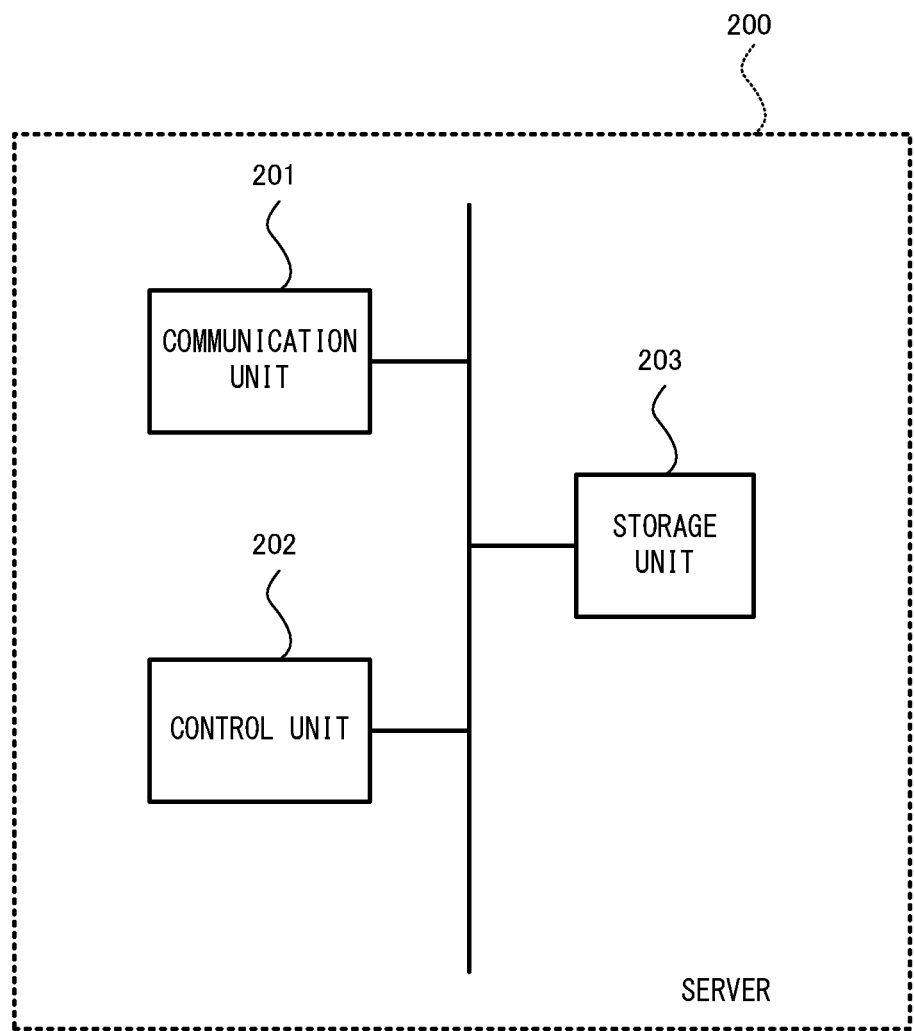
FIG. 3 is a block diagram illustrating a non-limiting example of a configuration of a server 200.

Next, the server 200 will be described with reference to FIG. 3. FIG. 3 is a block diagram illustrating a non-limiting example of a configuration of the server 200.

The server 200 has a communication unit 201, a control unit 202, and a storage unit 203. The communication unit 201 communicates with the information processing apparatuses 3, etc., through the network 100 by exchanging communication packets. As a non-limiting example, the control unit 202 performs a process of managing the progression of a game performed along with the information processing apparatus 3, a process of managing in-game currency (e.g., coins), game items, and game objects (e.g., characters appearing in a game, and pieces of equipment used in a game), etc., that are purchased by the user, and a process of managing information about payment or charging. The control unit 202 also establishes a communication link to the information processing apparatuses 3, etc., through the communication unit 201, and performs data transmission control and routing on the network 100. When a game is performed along with a plurality of information processing apparatuses 3, the control unit 202 manages a pairing or grouping of information processing apparatuses 3 that perform the game, and data communication between those information processing apparatuses 3. The storage unit 203 stores programs that are executed by the control unit 202, various items of data used for the above processes, various items of data used for communication with the information processing apparatuses 3, etc. When the system employs a predetermined log-in process for data exchange performed through the network 100, the server 200 may perform an authentication process to determine whether or not a user who tries to log in is an authorized user. The server 200 may be a single server machine or may include a plurality of server machines.

Figure 4:
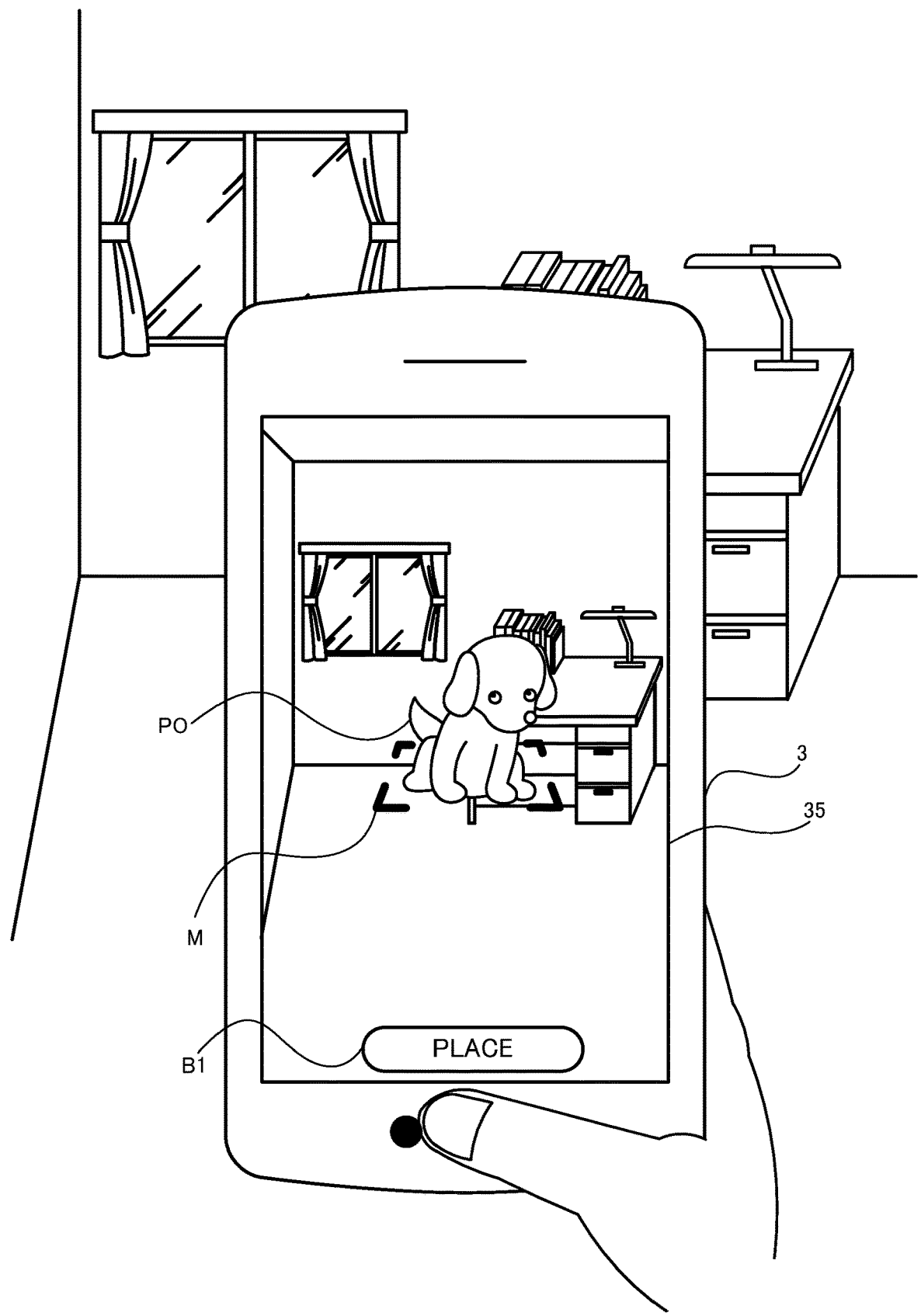
FIG. 4 is a diagram illustrating a non-limiting example of a game image displayed on a display unit 35 of the information processing apparatus 3 when the information processing apparatus 3 is being held by the user, before a plane has been detected on a captured image.
Figure 5:
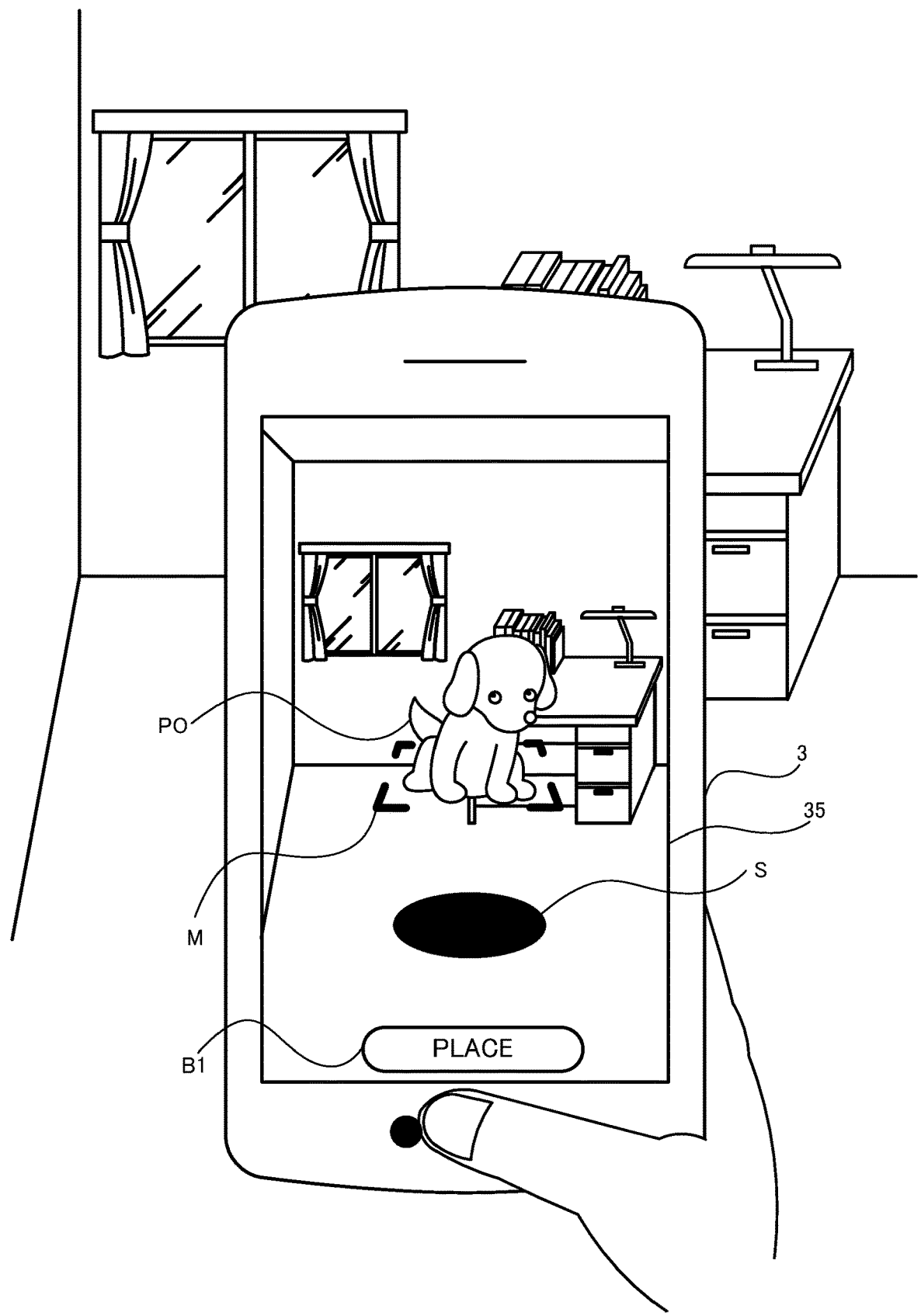
FIG. 5 is a diagram illustrating a non-limiting example of a game image displayed on the display unit 35 of the information processing apparatus 3 when the information processing apparatus 3 is being held by the user, after a plane has been detected in a captured image.
Figure 6:
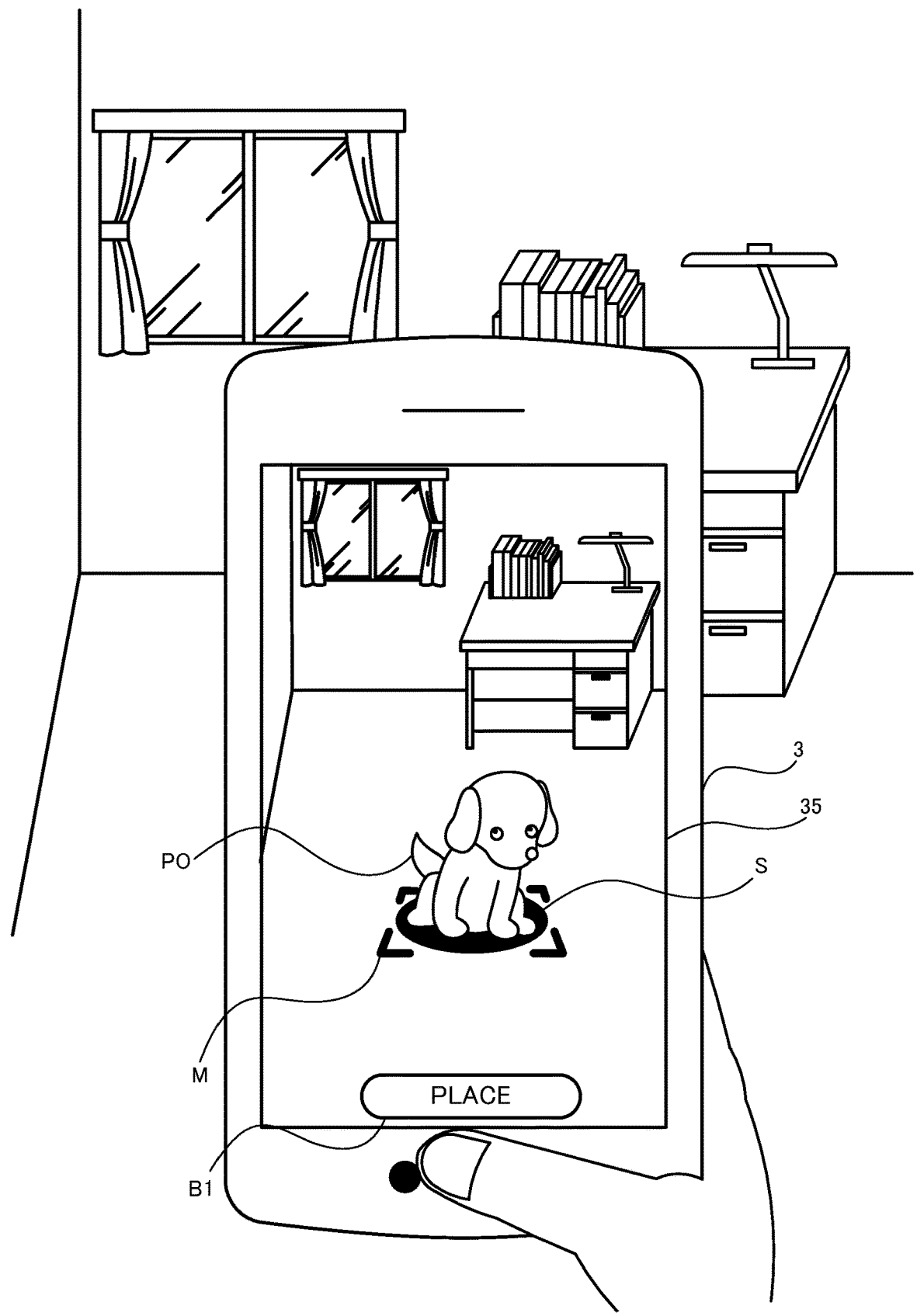
FIG. 6 is a diagram illustrating a non-limiting example of a game image in which a player object PO is overlaid on a captured image with the player object PO set on a virtual reference plane.
Figure 7:
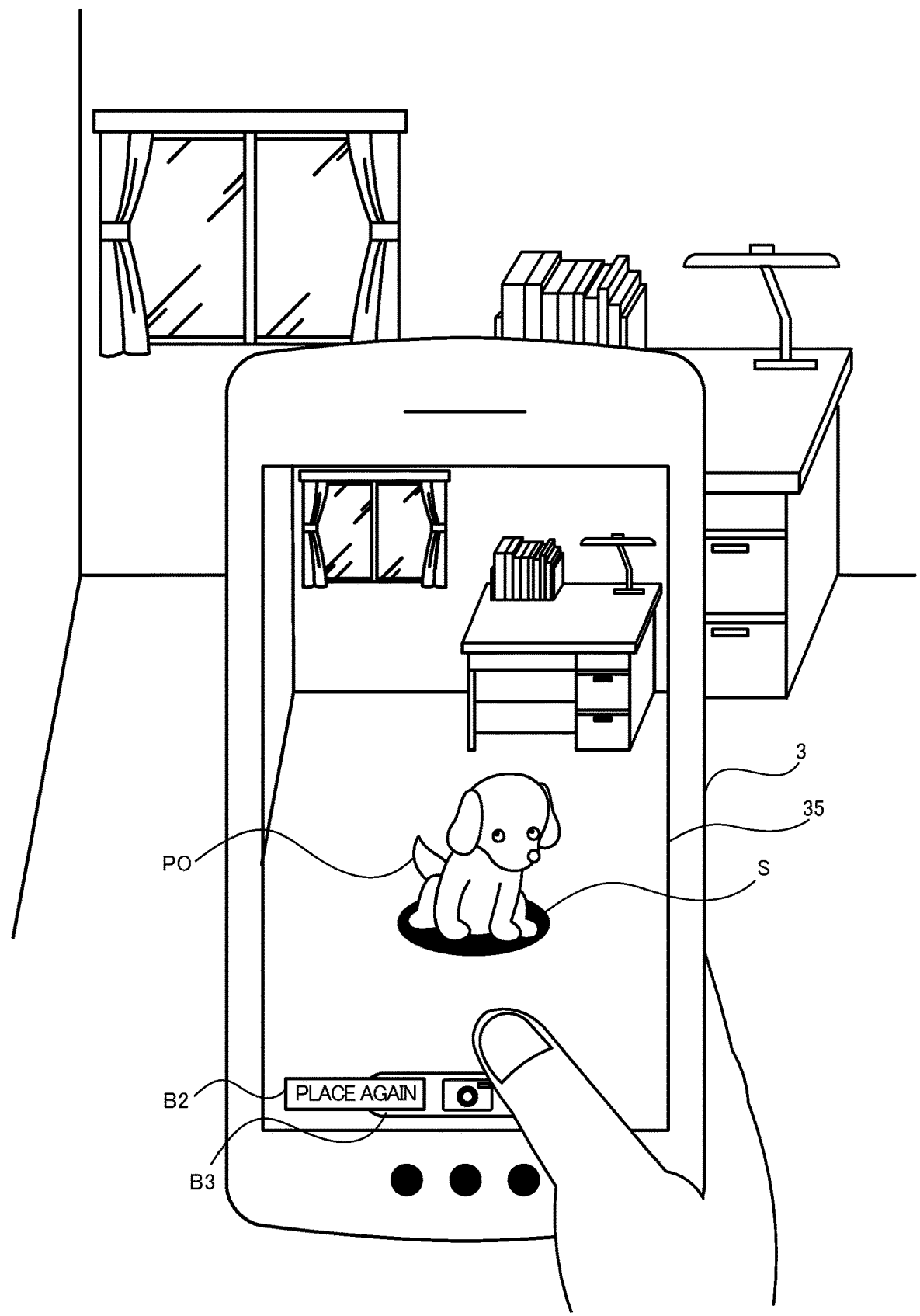
FIG. 7 is a diagram illustrating a non-limiting example of a game image in which a player object PO is overlaid and displayed on a captured image with the player object PO disposed on and fixed to a virtual reference plane.
Figure 8:
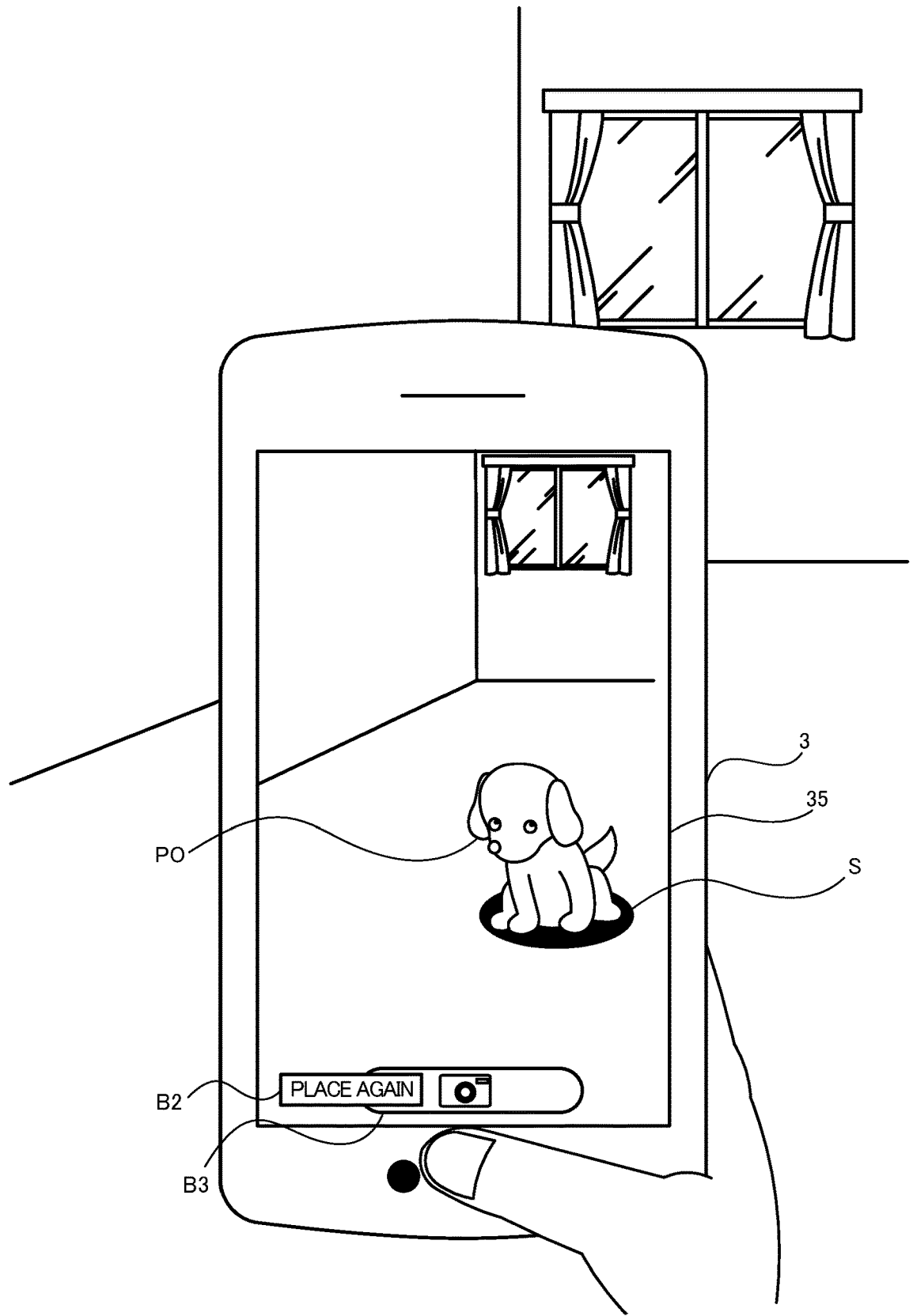
FIG. 8 is a diagram illustrating a non-limiting example of a game image when the position of the information processing apparatus 3 is moved with a player object PO disposed on and fixed to a virtual reference plane.
Figure 9:
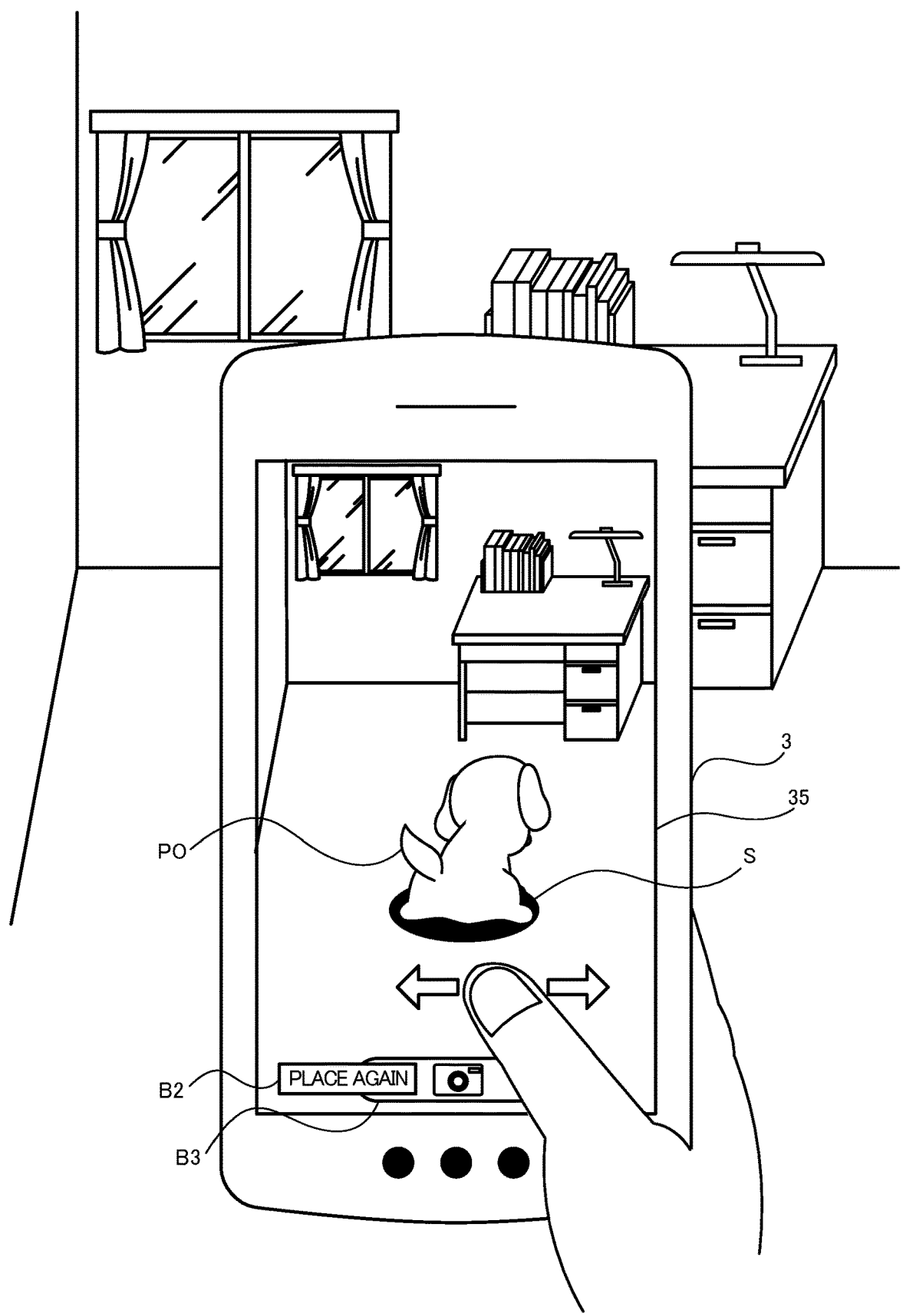
FIG. 9 is a diagram illustrating a non-limiting example of a game image when an operation of turning a player object PO is performed with the player object PO disposed on and fixed to a virtual reference plane.
Figure 10:
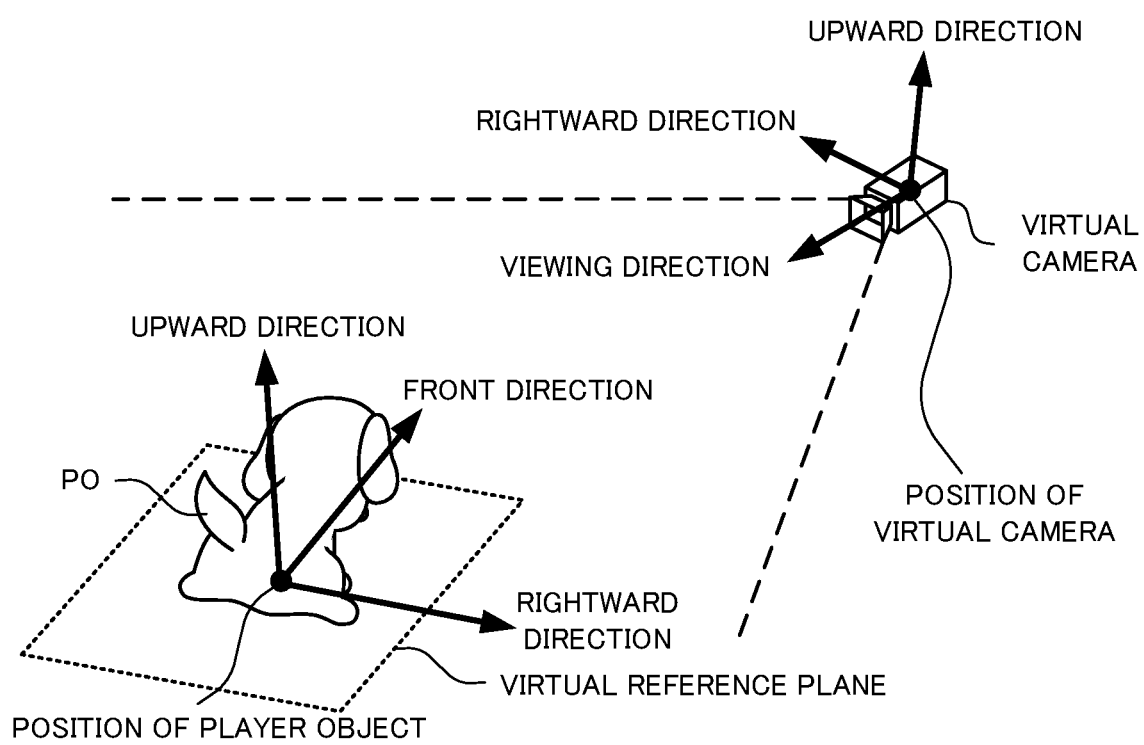
FIG. 10 is a diagram illustrating a non-limiting example of a positional relationship between a player object PO and a virtual camera in a virtual space.
Figure 11:
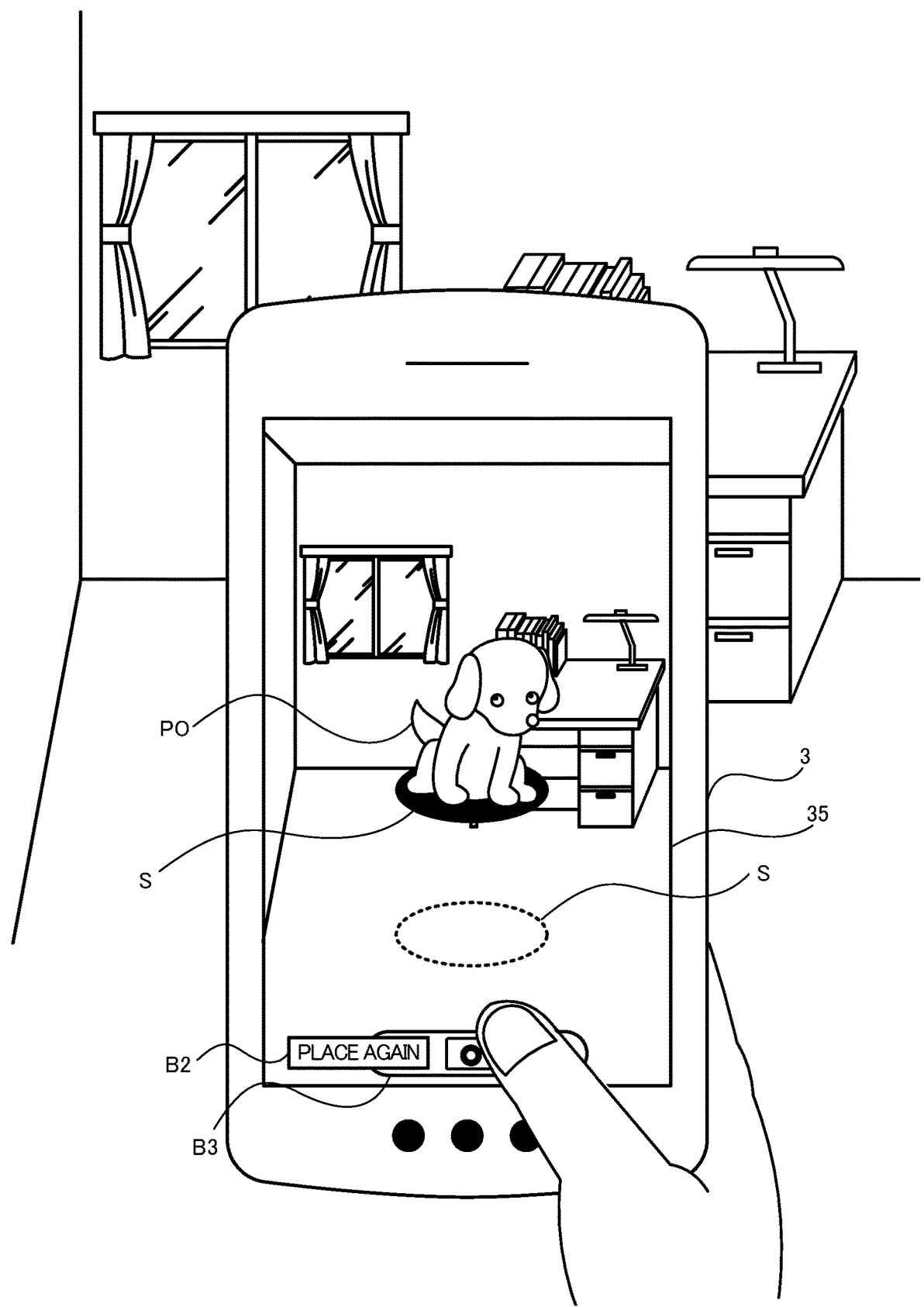
FIG. 11 is a diagram illustrating a non-limiting example of a game image in which a player object PO is overlaid and displayed on a captured image with the player object PO disposed at and fixed to a position away from a virtual reference plane.
Figure 12:
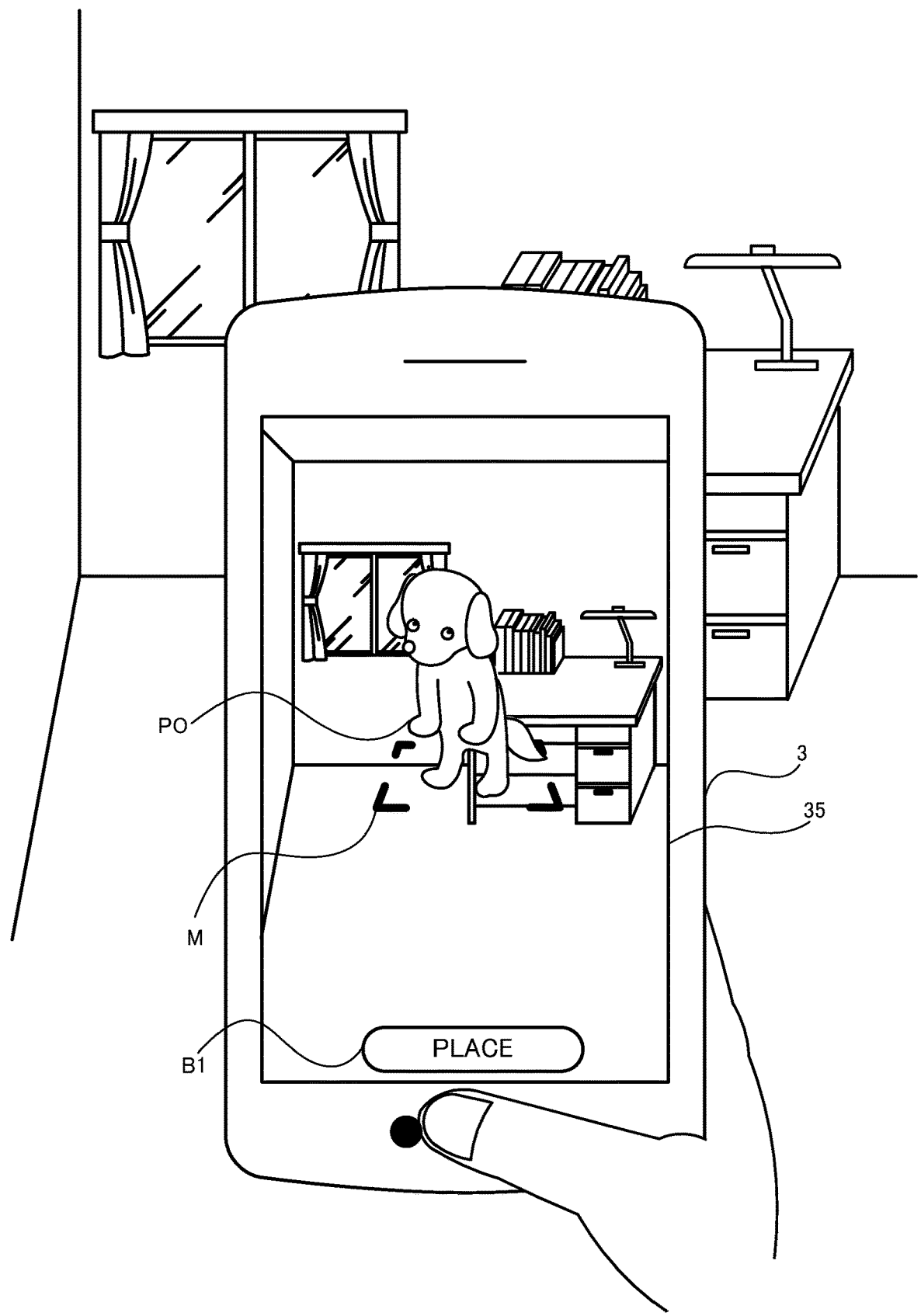
FIG. 12 is a diagram illustrating another non-limiting example of a game image displayed on the display unit 35 of the information processing apparatus 3 when the information processing apparatus 3 is being held by the user, before a plane has been detected on a captured image.

Next, before describing specific processes performed by the information processing apparatus 3 and the server 200, a non-limiting example of a game process performed in the information processing system 1 will be outlined with reference to FIGS. 4-12. It should be noted that FIG. 4 is a diagram illustrating a non-limiting example of a game image displayed on the display unit 35 of the information processing apparatus 3 when the information processing apparatus 3 is being held by the user, before a plane has been detected on a captured image. FIG. 5 is a diagram illustrating a non-limiting example of a game image displayed on the display unit 35 of the information processing apparatus 3 when the information processing apparatus 3 is being held by the user, after a plane has been detected in a captured image. FIG. 6 is a diagram illustrating a non-limiting example of a game image in which a player object PO is overlaid on a captured image with the player object PO set on a virtual reference plane. FIG. 7 is a diagram illustrating a non-limiting example of a game image in which a player object PO is overlaid and displayed on a captured image with the player object PO disposed on and fixed to a virtual reference plane. FIG. 8 is a diagram illustrating a non-limiting example of a game image when the position of the information processing apparatus 3 is moved with a player object PO disposed on and fixed to a virtual reference plane. FIG. 9 is a diagram illustrating a non-limiting example of a game image when an operation of turning a player object PO is performed with the player object PO disposed on and fixed to a virtual reference plane. FIG. 10 is a diagram illustrating a non-limiting example of a positional relationship between a player object PO and a virtual camera in a virtual space. FIG. 11 is a diagram illustrating a non-limiting example of a game image in which a player object PO is overlaid and displayed on a captured image with the player object PO disposed at and fixed to a position away from a virtual reference plane. FIG. 12 is a diagram illustrating another non-limiting example of a game image displayed on the display unit 35 of the information processing apparatus 3 when the information processing apparatus 3 is being held by the user, before a plane has been detected on a captured image. In the description that follows, although a game is used as a non-limiting example of an application executed in the information processing apparatus 3, other applications may be executed in the information processing apparatus 3.

In FIG. 4, in a game process of this non-limiting example, an overlay image in which an image (virtual space image) of a player object PO existing in a three-dimensional virtual space is overlaid on an image of the real world currently captured by the imaging unit 38, is displayed on the display screen of the display unit 35. As described in greater detail below, in this non-limiting example, an image of the player object PO can be overlaid such that the player object PO is disposed on a plane in the real world (e.g., a horizontal plane in the real world, such as a floor surface or a desk surface in the non-limiting example of FIG. 4) detected in a captured image acquired by the imaging unit 38, and the resultant image can be displayed on the display unit 35. However, in this non-limiting example, until the plane has been detected in the captured image, the player object PO is displayed on the display screen of the display unit 35 with the player object PO overlaid on the captured image. For example, as illustrated in FIG. 4, the player object is overlaid on the captured image and displayed on the display unit 35 such that the player object PO is displayed at a center of the display screen of the display unit 35, facing front.

As illustrated in FIG. 5, when a plane (e.g., a floor surface) in the real world is detected in a captured image acquired by the imaging unit 38, a shadow object S indicating a shadow of the player object PO is disposed on the plane, and is overlaid and displayed on the captured image. Specifically, when the plane is detected in the captured image, a virtual reference plane is set such that a position and orientation of the plane in the captured image correspond to a position and orientation of the virtual reference plane in a virtual space image when the virtual space image is overlaid on the captured image, i.e., in such an overlay image (combination image). Thereafter, the shadow object S indicating a shadow of the player object PO is attached to the virtual space image, along the virtual reference plane, at a position on the virtual reference plane directly below the player object PO, and the resultant virtual space image is overlaid and displayed on the captured image. Thus, when a plane is detected in a captured image, then if the shadow object S is displayed, the user of the information processing apparatus 3 can be notified of detection of the plane, and can be allowed to recognize the position of the detected plane in the captured image. It should be noted that the shadow object S may show a shadow having a shape based on a size or shape of the player object PO, or may be a circular or elliptical shape having a fixed size. As a technique of detecting a plane in a captured image, an existing plane detection function may be used. As a non-limiting example, a plurality of captured images may be acquired from different points of view by moving the imaging unit 38 and performing shooting at different timings, and feature points in the captured images may be associated with each other. The associated feature points may be subjected to a geometrical calculation (e.g., projective transformation), whereby a plane and a boundary of the plane may be detected in the captured image.

As illustrated in FIG. 6, when the player object PO is displayed on the display unit 35, the player object PO can be disposed on the shadow object S, i.e., the virtual reference plane set in the virtual space image, and can be overlaid and displayed on the captured image. For example, in the case where the display position of the player object PO is fixed such that the player object PO is displayed at a center of the display screen of the display unit 35, the player object PO can be displayed in the captured image at a position on a plane (e.g., a floor surface) detected in the real world by changing the position and/or orientation of the information processing apparatus 3 such that the shooting direction of the imaging unit 38 points the plane. In this case, in the virtual space image overlaid on the captured image, the player object PO is moved in the virtual space to be disposed on the shadow object S attached to the virtual reference plane, and therefore, the player object PO is controlled so as not to enter beneath the virtual reference plane (i.e., beneath the shadow object S). Thus, the shadow object S is displayed on the plane detected in the captured image, and the player object PO is disposed on the shadow object S when the player object PO is disposed on the plane. Therefore, it is possible to notify the user of the information processing apparatus 3 that the player object PO is disposed on the plane, in an easy-to-understand manner.

Here, even when the player object PO is disposed on the virtual reference plane, the player object PO is displayed on the display screen of the display unit 35 at or near the center, facing front, without being fixed to the position where the player object PO is disposed. Therefore, when the shooting position and/or orientation of the imaging unit 38 are changed in the real space, the player object PO is displayed such that the player object PO moves in the captured image along the virtual reference plane according to that change. When the shooting direction of the imaging unit 38 is changed in the real space, the player object PO continues to be displayed, facing front (i.e., facing front toward the imaging unit 38). As a result, the player object PO is displayed such that the orientation of the player object PO is changed in the real space, in which the captured image is acquired, according to the change in the shooting direction. It should be noted that the orientation of the player object PO, which is changed according to a change in the shooting direction, may be controlled in a manner that varies depending on the direction in which the shooting direction is changed. For example, when the shooting direction is changed in a horizontal plane in the real space, the pose or orientation of the displayed player object PO may not be changed, and when the shooting direction is changed in a vertical plane in the real space, the pose or orientation of the displayed player object PO may be changed in association with a change in the shooting direction.

It should be noted that in this non-limiting example, when a distance between the player object PO and the virtual reference plane in the virtual space is less than a predetermined threshold, the position where the player object PO is disposed may be controlled such that the player object PO is disposed on and in contact with the virtual reference plane. Thus, when the player object PO approaches the virtual reference plane until the distance is less than the threshold, the player object PO is moved as if the player object PO were attracted by the virtual reference plane, and is then disposed on the virtual reference plane. In addition, when the position of the player object PO determined by the position and orientation of the imaging unit 38 is a distance of less than the threshold away from the virtual reference plane, the position of the player object PO on the virtual reference plane is maintained. In other words, the position of the player object PO on the virtual reference plane is maintained unless the position of the player object PO determined by the position and orientation of the imaging unit 38 is a distance of at least the threshold away from the virtual reference plane. Therefore, the player object PO can be more easily disposed on the virtual reference plane, and can be stably disposed at a position on the virtual reference plane. As a result, the player object PO can be easily disposed on a detected plane in the captured image, and can be stably disposed and displayed on the detected plane. It should be noted that the threshold at which the player object PO is moved onto the virtual reference plane, and the threshold at which the player object PO is moved away from the virtual reference plane, may be the same or different.

In the control of the position where the player object PO is disposed using the threshold, a temporal condition may be additionally provided. For example, the player object PO may be moved onto the virtual reference plane if the player object PO has continued to be disposed a distance of less than the threshold away from the virtual reference plane for at least a first period of time. The player object PO may be moved away from the virtual reference plane if the player object PO has continued to be disposed a distance of at least the threshold away from the virtual reference plane for at least a second period of time. It should be noted that the first and second periods of time may be the same or different.

As illustrated in FIG. 7, the player object PO can be displayed with position fixation while the player object PO is disposed on the virtual reference plane according to the user's operation. As used herein, the position fixation means that the player object PO is controlled to be displayed such that the player object PO is disposed at a fixed position in the real space irrespective of changes in the position and orientation of the imaging unit 38. As a non-limiting example of a technique of implementing position fixation, in this non-limiting example, the position of the player object PO in the virtual space (as described below, the position is not limited to positions on the virtual reference plane) is fixed, and the virtual camera is moved according to the motion of the imaging unit 38. In this non-limiting example, as a specific example of position fixation, the player object PO is overlaid and displayed on the captured image with the position on the virtual reference plane where the player object PO is disposed in the virtual space being fixed. This allows the player object PO to be displayed such that the player object PO is disposed at and fixed to a position in the real space corresponding to a position on the virtual reference plane.

For example, as illustrated in FIGS. 4-6, a game image before position fixation of the player object PO includes a button image B1 for receiving the user's operation for position fixation of the player object PO. By performing a touch operation at a position where the button image B1 is being displayed, an instruction to perform position fixation is input. As illustrated in FIG. 7, when the player object PO is displayed in the position-fixed state, the button image B1 is erased, and button images B2 and B3 are displayed. Here, the button image B2 receives the user's operation for removing the position-fixed state. The button image B3 receives the user's operation for performing a still image acquisition process of storing a game image being displayed on the display unit 35 as a still image. It should be noted that the user's operation for establishing the position-fixed state may be other operations performed by the user, such as a touch operation performed on the player object PO. The user's operation for removing the position-fixed state may be other operations performed by the user, such as a tap operation performed on a game image at a position other than the display positions of the button images B2 and B3.

The player object PO is displayed in different display forms before and after position fixation in the captured image. For example, comparison of FIGS. 4-6 with FIG. 7 clearly indicates that before position fixation, the player object PO is displayed in the display form in which a label image M is added. Meanwhile, after position fixation, the player object PO is displayed in the display form in which the label image M is not added. Thus, the player object PO is displayed in the different display forms before and after position fixation, which can notify the user of whether or not the player object PO is in the position-fixed state. It should be noted that the change or difference in the display form between before and after position fixation is not limited to the presence or absence of the label image M, and may be other changes or differences in the display form. For example, the display form may be changed by adding other images, changing the color or lightness of the player object PO, changing the facial expression, orientation, action, or the like of the player object PO, or the like. It should be noted that the label image M corresponds to a non-limiting example of the change or difference in the display form of a virtual object between before and after a condition for position fixation is satisfied.

As illustrated in FIG. 8, when the player object PO is in the position-fixed state and is displayed in the captured image, the player object PO is displayed on the display unit 35, giving an appearance in association with the position and orientation (shooting state) of the imaging unit 38 in the real space. For example, when the position of the imaging unit 38 in the real space is changed, the player object PO is displayed such that the position from which the player object PO is viewed is changed by a change amount corresponding to the change in the position of the imaging unit 38 in the real space. In addition, when the shooting direction of the imaging unit 38 (the orientation of the imaging unit 38) is changed, the player object PO is displayed such that the angle at which the player object PO is viewed is changed by the same change in angle that the shooting direction of the imaging unit 38 is changed. Thus, when the position or orientation of the imaging unit 38 in the real space is changed, an overlay image that shows the player object PO as if the player object PO were disposed and fixed in the real space can be displayed on the display unit 35.

As illustrated in FIG. 9, in this non-limiting example, when the player object PO is in the position-fixed state, the player object PO can be turned around an axis perpendicular to the virtual reference plane according to the user's operation. For example, in the case where the input unit 34 has a touch panel provided on the screen of the display unit 35, when a touch operation of swiping (sliding) rightward on the touch panel is performed, the player object PO is turned anticlockwise around the axis perpendicular to the virtual reference plane. When a touch operation of swiping leftward on the touch panel is performed, the player object PO is turned clockwise around the axis perpendicular to the virtual reference plane. It should be noted that the angle by which the player object PO is turned may be changed, depending on the length across which a swipe operation is performed, or the player object PO may be turned by a predetermined angle each time a swipe operation is performed.

As described above, in this non-limiting example, by performing a touch operation on the button image B3 (see FIGS. 7-9), which is displayed when the player object PO is in the position-fixed state, a game image that is being displayed on the display unit 35 can be stored as a still image. When the player object PO is overlaid and displayed in the position-fixed state, the player object PO is displayed as if the player object PO were disposed and fixed in the real space, and therefore, a still image that shows the player object PO as if the player object PO existed in the real space can be obtained. Therefore, the user can virtually experience shooting of the player object PO using a camera in the real space.

As illustrated in FIG. 10, the above display control of the player object PO can be implemented using a movement and a change in orientation of the virtual camera provided in the virtual space. For example, the player object PO and the virtual camera are disposed in the virtual space.

When the player object PO is not in the position-fixed state and a plane has not been detected in the captured image (first state), the virtual camera and the player object PO are disposed in the virtual space such that the player object PO is in the field-of-view range of the virtual camera. For example, the player object PO is controlled such that the player object PO continues to be disposed at a center of the field-of-view range of the virtual camera, facing front toward the virtual camera and maintaining a predetermined distance from the virtual camera. The vertical direction of the player object PO is set to correspond to the direction of gravity in the virtual space. The vertical direction of the virtual camera is set such that the direction of gravity acting on the imaging unit 38 in the real space corresponds to the direction of gravity acting on the virtual camera in the virtual space. Therefore, even when the imaging unit 38 is moved or turned in a horizontal plane in the real space, a relative positional relationship or direction between the virtual camera and the player object PO is not changed. When the imaging unit 38 is turned in a vertical plane in the real space, the orientation of the virtual camera is changed in a manner similar to that of the imaging unit 38, and the direction of the virtual camera relative to the player object PO is changed with the relative positional relationship therebetween maintained. It should be noted that in the first state, the relative positional relationship and direction between the virtual camera and the player object PO may be fixed. In that case, the relative positional relationship and direction between the virtual camera and the player object PO may be fixed such that the shooting direction of the virtual camera is parallel to the front direction of the player object PO.

When the player object PO is not in the position-fixed state and a plane has been detected in the captured image (second state), a virtual reference plane corresponding to that plane is set in the virtual space. In addition, the shadow object S is disposed in a predetermined range along the virtual reference plane with the center of the shadow object S located at the position where the direct downward direction of the player object PO (the vertical direction of the virtual space) and the virtual reference plane intersect. In such a virtual space, the virtual camera is moved in a manner similar to that in which the imaging unit 38 is moved in the real space, and the orientation of the virtual camera is changed in a manner similar to that in which the orientation (shooting state) of the imaging unit 38 is changed in the real space, and the player object PO is disposed in the field-of-view range of the virtual camera with a predetermined distance therebetween maintained (e.g., at the gaze point of the virtual camera that is a predetermined distance away from the virtual camera). The orientation of the player object PO is controlled such that the vertical direction of the player object PO corresponds to the direction of gravity of the virtual space, and the virtual camera is disposed in front of the player object PO.

As used here, that the orientation of the virtual camera is changed in the virtual space in a manner similar to that in which the orientation of the imaging unit 38 is changed in the real space means that the orientation of the virtual camera in the virtual space is controlled such that when the orientation of the imaging unit 38 is changed in the real space, the orientation of the virtual camera in the virtual space is changed in the same direction and change amount as those of a change in the orientation of the imaging unit 38. As used herein, that the virtual camera is moved in the virtual space in a manner similar to that in which the imaging unit 38 is moved in the real space means that the position of the virtual camera is controlled such that when the position of the imaging unit 38 is changed in the real space, the position of the virtual camera in the virtual space is moved in the same direction in which the imaging unit 38 is moved in the real space, and by the distance in the virtual space that corresponds to the distance by which the imaging unit 38 is moved in the real space (i.e., when the position of the imaging unit 38 is moved by a first change amount in the real space, the position of the virtual camera is changed by a second change amount in the virtual space that is proportional to the first change amount (the proportional ratio varies depending on the scale ratio of the real space and the virtual space)).

In the second state, when the distance between the player object PO and the virtual reference plane is less than a predetermined threshold, the player object PO is moved such that the player object PO is disposed on and in contact with the virtual reference plane. When the player object PO is disposed on the virtual reference plane, the player object PO is allowed to be moved or turned while being maintained in contact with the virtual reference plane unless the player object PO is controlled to be moved at least the threshold distance away from the virtual reference plane due to a movement or a change in the orientation of the virtual camera (e.g., the control is such that the gaze point located a predetermined distance away from the virtual camera is moved to a position that is at least the threshold distance away from the virtual reference plane). When the player object PO is controlled to be moved at least the threshold distance away from the virtual reference plane due to a movement or a change in the orientation of the virtual camera, the player object PO is lifted to a position that is at least the threshold distance above the virtual reference plane. Thus, when the imaging unit 38 is moved or turned in a horizontal plane in the real space, the relative positional relationship between the virtual camera and the player object PO is not changed. Meanwhile, when the imaging unit 38 is turned in a vertical plane in the real space, the orientation of the virtual camera in the virtual space is changed in a manner similar to that in which the orientation of the imaging unit 38 is changed, and the relative positional relationship between the virtual camera and the player object PO is changed. When the imaging unit 38 is moved or turned in a vertical plane in the real space, so that the player object PO approaches the virtual reference plane (the plane detected in the captured image), the motion of the player object PO is represented as if the player object PO were attracted by the virtual reference plane.

When the player object PO is disposed on the virtual reference plane in the second state, then if position fixation is performed on the player object PO (third state), the player object PO and the shadow object S are fixed in the virtual space. In this situation, the virtual camera is moved in the virtual space in a manner similar to that in which the imaging unit 38 is moved in the real space, and the orientation of the virtual camera is changed in the virtual space in a manner similar to that in which the orientation (shooting state) of the imaging unit 38 is changed in the real space. When the user's operation of turning the player object PO (a touch operation of swiping leftward or rightward on the touch panel) is performed, the player object PO is turned around the axis perpendicular to the virtual reference plane in the direction corresponding to the operation direction and by a change angle. When the operation of removing the position-fixed state of the player object PO is performed, the state of the player object PO is returned to the first or second state, depending on the presence or absence of a plane detected in the captured image, and the position and orientation control of the virtual camera and the player object PO is performed in the virtual space.

Although in the foregoing, the control of changing the position and/or orientation of the virtual camera is performed, the position and/or orientation of the player object PO or the positions and/or orientations of both the virtual camera and the player object PO may be changed such that the relative positions or directions of the virtual camera and the player object PO in the virtual space are changed in a similar manner. In addition, although in the foregoing, the position and/or orientation of the player object PO are controlled to be changed, the position and/or orientation of the virtual camera or the positions and/or orientations of both the virtual camera and the player object PO may be changed such that the relative positions or directions of the virtual camera and the player object PO in the virtual space are changed in a similar manner. Of course, the above-described control of the positional relationship and directions of the virtual camera and the player object PO is not particularly limited. Any control may be employed that can change the relative positions and directions of the virtual camera and the player object PO in the virtual space in a similar manner.

Although in the foregoing, the position and/or orientation of the virtual camera are controlled to be changed, the position and/or orientation of the virtual reference plane or the positions and/or orientations of both the virtual camera and the virtual reference plane may be changed such that the relative positions or directions of the virtual camera and the virtual reference plane in the virtual space are changed in a similar manner. Of course, the above-described control of the positional relationship and directions of the virtual camera and the virtual reference plane is not particularly limited. Any control may be employed that can change the relative positions and directions of the virtual camera and the virtual reference plane in the virtual space in a similar manner.

In this non-limiting example, the position fixation of the player object PO may be allowed even when the player object PO is not disposed on the virtual reference plane or when a plane has not been detected in the captured image. For example, as illustrated in FIG. 11, if, when the player object PO is not disposed on the virtual reference plane, the user's operation for position fixation is performed, the player object PO is overlaid and displayed on the captured image with the player object PO fixed to that position, i.e., a position away from the virtual reference plane. As a result, the player object PO is displayed, being fixed to a position in the real space corresponding to the position in the virtual space. Thus, an image is displayed in which the player object PO is fixed to a position in the real space that is away from the plane detected in the captured image.

For example, if, when the player object PO is not disposed on the virtual reference plane after a plane has been detected in the captured image, the user's operation for position fixation of the player object PO is performed, the shadow object S (the dashed-line region illustrated in FIG. 11) disposed on the virtual reference plane is moved to a position where the shadow object S is in contact with a lower surface of the player object PO (the position of the shadow object S illustrated in FIG. 11), and the player object PO is displayed in the position-fixed state. When the player object PO is in the position-fixed state at a position away from the virtual reference plane and is overlaid and displayed on the captured image, the player object PO is displayed on the display unit 35, giving an appearance in association with the position and orientation (shooting state) of the imaging unit 38 in the real space. For example, as in the state that the player object PO is disposed on the virtual reference plane, when the position of the imaging unit 38 is changed in the real space, the player object PO is displayed such that the position from which the player object PO is viewed is changed by a change amount corresponding to the change in the position of the imaging unit 38. In addition, when the shooting direction of the imaging unit 38 (the orientation of the imaging unit 38) is changed, the player object PO is displayed such that the angle at which the player object PO is viewed is changed by the same change in angle that the direction in which the player object PO is viewed is changed. As a result, even when the player object PO is in the position-fixed state at a position away from the virtual reference plane, then if the position or orientation of the imaging unit 38 in the real space is changed, an overlay image that shows the player object PO as if the player object PO were disposed at and fixed to that position in the real space can be displayed on the display unit 35.

It should be noted that even when the player object PO is in the position-fixed state while the player object PO is not disposed on the virtual reference plane, the player object PO may be displayed in different display forms before and after the position fixation. In addition, even when the player object PO is in the position-fixed state while the player object PO is not disposed on the virtual reference plane, the player object PO may be allowed to be turned around the axis perpendicular to the virtual reference plane according to the user's operation.

Such position fixation of the player object PO no longer requires the virtual reference plane, and therefore, may also be allowed even when a plane may not have been detected in the captured image. In that situation, a plane has not been detected in the captured image, and the shadow object S has yet to be set, and therefore, the shadow object S may not be displayed in the overlay image.

The player object PO may also be displayed in different display forms before and after a plane has been detected in the captured image, or depending on whether or not the player object PO is disposed on the virtual reference plane. For example, as illustrated in FIG. 12, the player object PO may be caused to perform an action such as vertically stretching the body and fluttering the legs, before a plane has been detected in the captured image or when a plane has been detected in the captured image and the player object PO is not disposed on the virtual reference plane. In that case, as illustrated in FIGS. 5 and 6, after a plane has been detected in the captured image or when the player object PO is disposed on the virtual reference plane, the player object PO may be displayed such that the player object PO is sitting down without fluttering the legs. Thus, by causing the player object PO to take different motions or poses before and after the detection of a plane or depending on whether or not the player object PO is disposed on the virtual reference plane, the user can be notified that a plane has not been detected or that the player object PO is not disposed on a plane, and the reality of an image indicating that situation can be improved.

The action of the player object PO that is performed when the player object PO is overlaid and displayed on the captured image may be able to be changed according to the user's operation. For example, the action of the player object PO may be changed, according to the user's operation of selecting one from the actions that can be taken by the player object PO, and overlaid and displayed on the captured image. Examples of the optional actions that can be taken by the player object PO may include changes in pose, changes in motion, and changes in facial expression, such as joy, anger, sorrow, and pleasure. The action of the player object PO may be allowed to be changed in a particular state. For example, the action of the player object PO may be allowed to be changed according to the user's operation only when the player object PO is in the position-fixed state.

Although in the foregoing non-limiting examples, the information processing apparatus 3 including the display unit 35 and the imaging unit 38 is used, a display unit for displaying an overlay image and/or an imaging unit for obtaining a captured image may be provided external to an apparatus having the control unit 31.

Thus, in this non-limiting example, even before a plane has been first detected in a captured image of the real space since the start of a game process, the player object PO can be overlaid and displayed on the captured image. Therefore, the response time that it takes to overlay and display the player object PO can be reduced. In addition, in this non-limiting example, even before such a plane has been first detected since the start of a game process, the player object PO can be displayed such that the player object PO is in the position-fixed state in the captured image. Therefore, the response time that it takes to perform position fixation on the player object PO in the captured image and display the player object PO can be reduced.

Although in the foregoing non-limiting examples, the player object PO is overlaid and displayed on the captured image, images of other virtual objects may be overlaid and displayed on the captured image. Examples of other virtual objects may include non-player objects, furniture, fitments, instruments, and vehicles.

Next, processes performed in the information processing apparatus 3 will be described in detail. Firstly, main data used in processes performed in the information processing apparatus 3 will be described with reference to FIG. 13. It should be noted that FIG. 13 is a diagram illustrating a non-limiting example of main data and programs stored in the storage unit 32 of the information processing apparatus 3.

Figure 13:
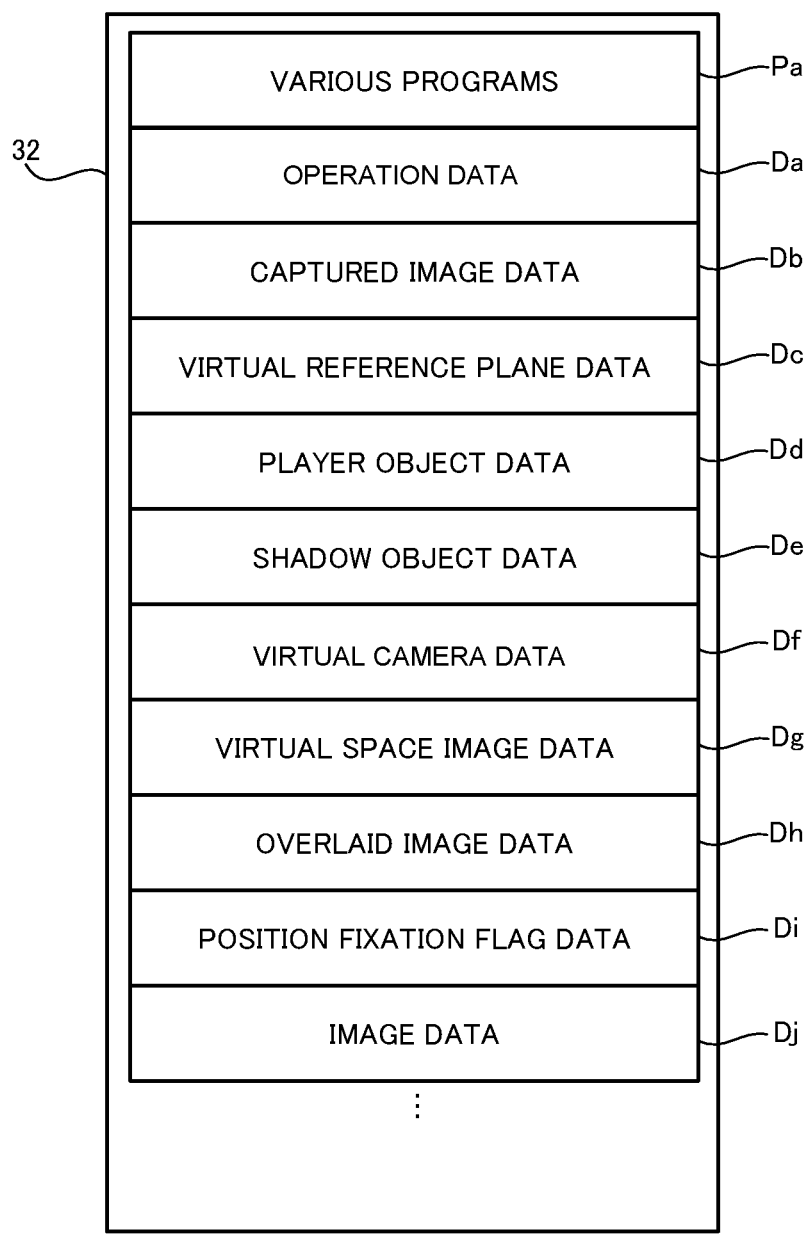
FIG. 13 is a diagram illustrating a non-limiting example of main data and programs stored in a storage unit 32 of the information processing apparatus 3.

As illustrated in FIG. 13, the storage unit 32 stores, in a data storage area, operation data Da, captured image data Db, virtual reference plane data Dc, player object data Dd, shadow object data De, virtual camera data Df, virtual space image data Dg, overlay image data Dh, position fixation flag data Di, image data Dj, and the like. It should be noted that the storage unit 32 stores, in addition to the data of FIG. 13, data required in processes such as data used in an executed application. The storage unit 32 also stores, in a program storage area, various programs Pa including an information processing program (game program), etc.

The operation data Da indicates operation information about the user's operation on the information processing apparatus 3. For example, operation data indicating an operation performed on the input unit 34 including the touch panel is acquired at time intervals that are the unit process time (e.g., 1/60 sec) of the information processing apparatus 3, and is stored in the operation data Da, i.e., the operation data Da is updated in response to the acquisition of that operation data. In addition, operation data detected by the inertial sensor 37 when the information processing apparatus 3 (display unit 35) is operated is acquired at time intervals which are the unit processing time of the information processing apparatus 3, and is stored in the operation data Da, i.e., the operation data Da is updated in response to the acquisition of that operation data. It should be noted that the operation data Da includes, in addition to data indicating the most recent input entered by the user's operation using the input unit 34, at least a history of the user's inputs until a predetermined period of time before (e.g., a history of touch positions where a touch operation was performed on the touch panel).

The captured image data Db indicates a captured image of the real space acquired by the imaging unit 38. It should be noted that the captured image data Db is updated with a captured image acquired by the imaging unit 38 at regular intervals, which may be equal to or shorter than the unit process time (e.g., 1/60 seconds) of the information processing apparatus 3. In the case where the process interval of the information processing apparatus 3 is shorter than the update interval of the captured image data Db, the captured image data Db may be updated, as appropriate, independently of the process described below. In that case, in the step of acquiring a captured image described below, processing may be inevitably performed using the most recent captured image indicated by the captured image data Db.

The virtual reference plane data Dc indicates a virtual reference plane set in the virtual space.

The player object data Dd indicates the position, orientation, motion, display form, etc., of the player object PO. The shadow object data De indicates the position, shape, display form, etc., of the shadow object S.

The virtual camera data Df indicates the position, orientation, etc., of the virtual camera.

The virtual space image data Dg indicates an image of the virtual space as viewed from the virtual camera. The overlay image data Dh indicates an overlay image generated by overlaying a virtual space image on a captured image.

The position fixation flag data Di indicates a position fixation flag that is set "on" when the player object PO is in the position-fixed state.

The image data Dj is for displaying a virtual space image (e.g., an image of the player object PO, an image of the shadow object S, etc.) on the display unit 35.

Figure 16:
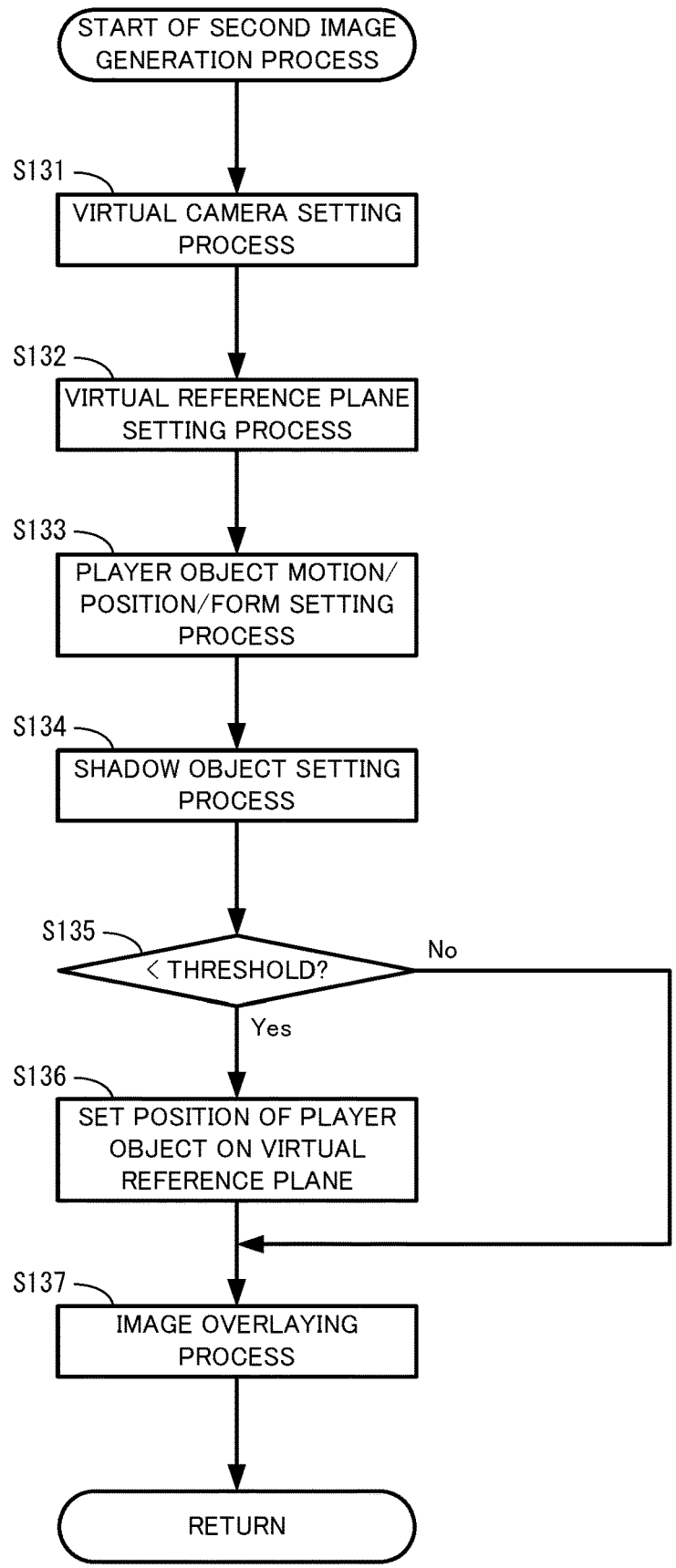
FIG. 16 is a subroutine showing a detailed non-limiting example of a second image generation process in step S109 of FIG. 14.
Figure 17:
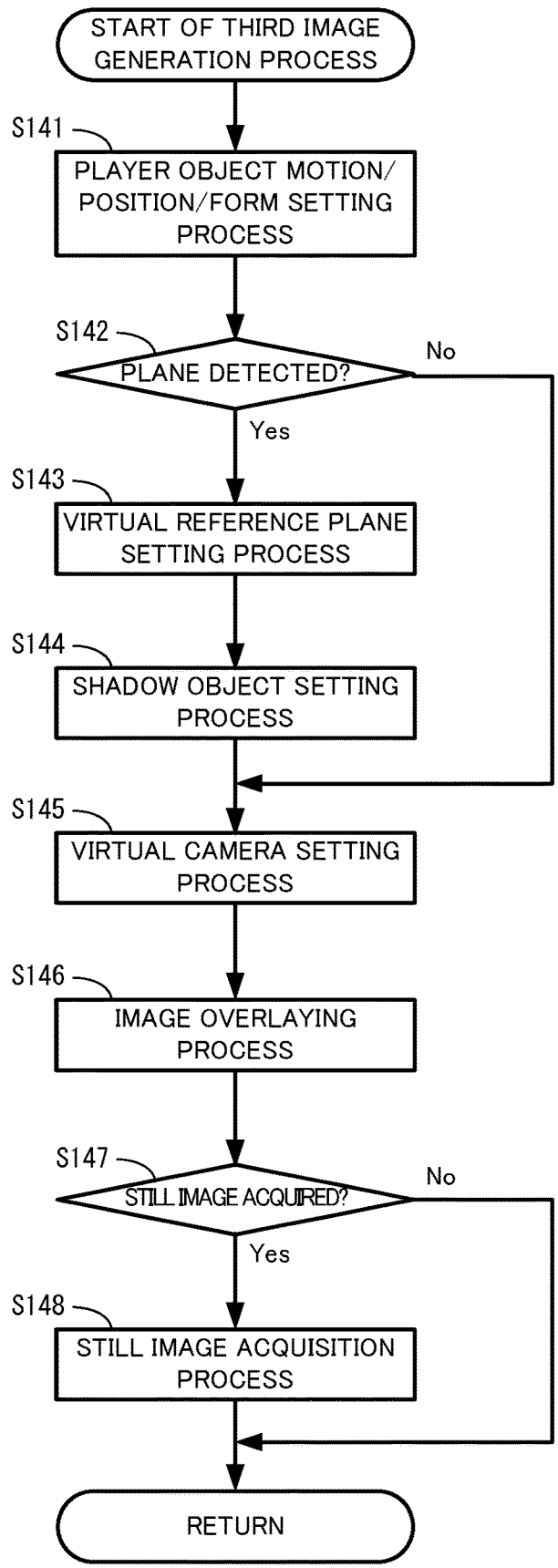
FIG. 17 is a subroutine showing a detailed non-limiting example of a third image generation process in step S110 of FIG. 14.

Next, processes performed in the information processing apparatus 3 will be described in detail with reference to FIGS. 14-17. It should be noted that FIG. 14 is a flowchart illustrating a non-limiting example of a process that is executed in the information processing apparatus 3. FIG. 15 is a subroutine illustrating a detailed non-limiting example of a first image generation process in step S108 of FIG. 14. FIG. 16 is a subroutine showing a detailed non-limiting example of a second image generation process in step S109 of FIG. 14. FIG. 17 is a subroutine showing a detailed non-limiting example of a third image generation process in step S110 of FIG. 14. Here, in the flowcharts of FIGS. 14-17, game processes involved in the display control of the player object PO, of the processes of the information processing system 1, will be mainly described as a non-limiting example, and the other processes that are not directly involved with these processes will not be described in detail. In FIGS. 14-17, each step executed by the control unit 31 is abbreviated to "S."

In this non-limiting example, processes shown in FIGS. 14-17 are performed by the control unit 31 (CPU) executing a game program, etc., stored in the program storage unit 33. It should be noted that the processes of FIGS. 14-17 are started with any appropriate timing. At this time, all or a portion of the game program is read from the storage unit 32 with appropriate timing, and is executed by the control unit 31. Thus, the processes of FIGS. 14-17 are started. It should be noted that the game program is assumed to be previously stored in the program storage unit 33. In another non-limiting example, the game program may be acquired from a storage medium removably attached to the information processing apparatus 3, and stored into the storage unit 32, or may be acquired from another apparatus through a network, such as the Internet, and stored into the storage unit 32.

The steps of the flowcharts of FIGS. 14-17 are merely illustrative. The order in which the steps are performed may be changed, and another step may be executed in addition to or instead of each step, if a similar result is acquired. Although in this non-limiting example, it is assumed that each step of the flowcharts is executed by the control unit 31, all or a portion of the steps of the flowcharts may be executed by another processor or a dedicated circuit instead of the CPU of the control unit 31.

In FIG. 14, the control unit 31 sets initial settings (step S101), and proceeds to the next step. For example, the control unit 31 initially sets parameters for use in the subsequent steps. For example, the control unit 31 sets a player object PO that is to be overlaid and displayed on a captured image, initially sets the motion and display form of the player object PO, and updates the player object data Dd.

Next, the control unit 31 acquires operation data from the input unit 34 and the inertial sensor 37, and updates the most recent data of the operation data Da and the history of the operation data (step S102), and proceeds to the next step.

Next, the control unit 31 acquires a captured image (step S103), and proceeds to the next step. For example, the control unit 31 updates the captured image data Db with data indicating the captured image acquired by the imaging unit 38.

Next, the control unit 31 performs the process of detecting a plane in the captured image (step S104), and proceeds to the next step. For example, the control unit 31 detects a plane in the captured image acquired in step S103, using an existing plane detection function.

Next, the control unit 31 performs a position fixation setting process (step S105), and proceeds to the next step. For example, the control unit 31 refers to the operation data acquired in step S102, and if the user has performed an operation of putting the player object PO into the position-fixed state has been performed, sets the position fixation flag "on" and updates the position fixation flag data Di. If the user has performed an operation of removing the position-fixed state of the player object PO, the control unit 31 sets the position fixation flag "off" and updates the position fixation flag data Di.

Next, the control unit 31 determines whether or not the player object PO is in the position-fixed state (step S106). For example, if the position fixation flag indicated by the position fixation flag data Di is on, the result of the determination by the control unit 31 in step S106 is positive. If the player object PO is not in the position-fixed state, the control unit 31 proceeds to step S107. Otherwise, i.e., if the player object PO is in the position-fixed state, the control unit 31 proceeds to step S110.

In step S107, the control unit 31 determines whether or not a plane has been detected in the captured image. For example, if, in step S104, a plane has been detected in the captured image, the result of the determination by the control unit 31 in step S107 is positive. If a plane has not been detected in the captured image, the control unit 31 proceeds to step S108. Otherwise, i.e., if a plane has been detected in the captured image, the control unit 31 proceeds to step S109.

In step S108, the control unit 31 performs a first image generation process, and proceeds to step S111. The first image generation process, which is performed in step S108, will be described with reference to FIG. 15 below.

In FIG. 15, the control unit 31 sets a virtual camera in the virtual space (step S121), and proceeds to the next step. For example, the control unit 31 sets the position of a virtual camera for generating a display image to a predetermined position (initial position) in the virtual space. The control unit 31 also sets the orientation of the virtual camera, based on data that has been acquired from the inertial sensor 37 and is stored in the operation data Da, such that the direction of gravity acting on the imaging unit 38 (information processing apparatus 3) in the real space corresponds to the direction of gravity acting on the virtual camera in the virtual space, and updates the virtual camera data Df.

Next, the control unit 31 sets the player object PO in the virtual space (step S122), and proceeds to the next step. For example, the control unit 31 sets the position of the player object PO to a center of the field-of-view range that is a predetermined distance away from the virtual camera in the virtual space. The control unit 31 also sets the orientation of the player object PO such that the vertical direction of the player object PO in the virtual space corresponds to the direction of gravity of the virtual space, and the player object PO faces front toward the virtual camera. The control unit 31 also sets the display form of the player object PO to one that indicates that the player object PO is not in the position-fixed state (e.g., the display form in which the label image M is attached to the player object PO), and updates the player object data Dd.

Next, the control unit 31 performs an image overlaying process (step S123), and ends the subroutine. For example, the control unit 31 generates an image (virtual space image) of the virtual space as viewed from the virtual camera, and updates the virtual space image data Dg with data indicating the virtual space image. The control unit 31 also generates an overlay image in which the virtual space image indicated by the virtual space image data Dg is overlaid on the captured image indicated by the captured image data Db, and updates the overlay image data Dh with data indicating the overlay image.

Referring back to FIG. 14, if the result of the determination in step S107 is positive, the control unit 31 performs a second image generation process (step S109), and proceeds to step S111. The second image generation process performed in step S109 will be described with reference to FIG. 16 below.

In FIG. 16, the control unit 31 sets a virtual camera in the virtual space (step S131), and proceeds to the next step. For example, the control unit 31 changes the position and orientation of the virtual camera in the virtual space which are indicated by the virtual camera data Df, based on data that has been acquired from the inertial sensor 37 and is stored in the operation data Da, such that the changed position and orientation of the virtual camera correspond to the motion (a movement and a change in orientation) of the imaging unit 38 (information processing apparatus 3) in the real space, and updates the virtual camera data Df with the changed position and orientation.

Next, the control unit 31 performs a process of setting a virtual reference plane in the virtual space (step S132), and proceeds to the next step. The control unit 31 sets a virtual reference plane in the virtual space such that the virtual reference plane coincides with the plane detected in step S104 in the overlay image. For example, the control unit 31 sets the virtual reference plane in the virtual space such that the position and orientation of the virtual reference plane in the virtual space image as viewed from the virtual camera set in step S131 (i.e., an image of the virtual space overlaid on the captured image) correspond to the position and orientation of the plane in the captured image when the virtual space image is overlaid on the captured image, and updates the virtual reference plane data Dc with data indicating the virtual reference plane. Thus, the virtual reference plane set in the virtual space corresponds to the plane detected in the captured image, in the overlay image (combination image) in which the virtual reference plane is overlaid on the captured image.

Next, the control unit 31 sets the player object PO in the virtual space (step S133), and proceeds to the next step. For example, the control unit 31 sets the position of the player object PO to a center of the field-of-view range that is a predetermined distance away from the virtual camera in the virtual space. It should be noted that in this non-limiting example, the player object PO is not disposed in a space directly below the virtual reference plane in the virtual space. Therefore, when the position of the player object PO is in that space, the control unit 31 sets the position of the player object PO to a position on the virtual reference plane which is directly above that position and at which the player object PO is in contact with the virtual reference plane. The control unit 31 also sets the orientation of the player object PO such that, in the virtual space, the vertical direction of the player object PO corresponds to the direction of gravity in the virtual space, and the player object PO faces front toward the virtual camera. The control unit 31 also sets the display form of the player object PO to one that indicates that the player object PO is not in the position-fixed state (e.g., the display form in which the label image M is attached to the player object PO), and updates the player object data Dd.

Next, the control unit 31 sets a shadow object S in the virtual space (step S134), and proceeds to the next step. For example, the control unit 31 attaches the shadow object S indicating the shadow of the player object PO, along the virtual reference plane, to a position on the virtual reference plane which is directly below the player object PO, in the virtual space, and updates the shadow object data De with data indicating the shadow object S.

Next, the control unit 31 determines whether or not the distance between the player object PO and the virtual reference plane in the virtual space is less than a predetermined threshold (step S135). If the distance between the player object PO and the virtual reference plane is less than the predetermined threshold, the control unit 31 proceeds to step S136. Otherwise, i.e., if the distance between the player object PO and the virtual reference plane is more than or equal to the predetermined threshold, the control unit 31 proceeds to step S137.

In step S136, the control unit 31 sets the position of the player object PO on the virtual reference plane, and proceeds to step S137. For example, the control unit 31 moves the position of the player object PO in the vertical direction of the virtual space so as to dispose the player object PO at a position where the player object PO is on and in contact with the virtual reference plane, and updates the player object data Dd with that position.

In step S137, the control unit 31 performs an image overlaying process, and ends the subroutine. It should be noted that the image overlaying process in step S137 is similar to that in step S123, and will not herein described in detail.

Referring back to FIG. 14, if the result of the determination in step S106 is positive, the control unit 31 performs a third image generation process (step S110), and proceeds to step S111. The third image generation process performed in step S110 will be described below with reference to FIG. 17.

In FIG. 17, the control unit 31 sets the player object PO in the virtual space (step S141), and proceeds to the next step. For example, the control unit 31 maintains the current position of the player object PO in the virtual space. The control unit 31 also refers to data that has been acquired from the input unit 34 and is stored in the operation data Da. If data indicates that the user's operation of turning the player object PO around the axis perpendicular to the virtual reference plane has been performed, the control unit 31 sets the orientation of the player object PO by turning the player object PO by the angle corresponding to the user's operation. The control unit 31 also sets the display form of the player object PO to one that indicates the position-fixed state (e.g., a display form that does not have the label image M), and updates the player object data Dd.

Next, the control unit 31 determines whether or not a plane has been detected in the captured image (step S142). For example, if, in step S104, a plane has been detected in the captured image, the result of the determination by the control unit 31 in step S142 is positive. If a plane has been detected in the captured image, the control unit 31 proceeds to step S143. Otherwise, i.e., if a plane has not been detected in the captured image, the control unit 31 proceeds to step S145.

In step S143, the control unit performs a process of setting a virtual reference plane in the virtual space, and proceeds to the next step. It should be noted that step S143 is similar to step S132, and will not herein be described in detail.

Next, the control unit 31 sets a shadow object S in the virtual space (step S144), and proceeds to step S145. For example, the control unit 31 attaches the shadow object S indicating the shadow of the player object PO, along the virtual reference plane, to a position on the virtual reference plane which is directly below the player object PO, in the virtual space, and updates the shadow object data De with data indicating the shadow object S.

In step S145, the control unit 31 sets a virtual camera in the virtual space, and proceeds to the next step. For example, the control unit 31 changes the position and orientation of the virtual camera in the virtual space which are indicated by the virtual camera data Df, based on data that has been acquired from the inertial sensor 37 and is stored in the operation data Da, such that the changed position and orientation of the virtual camera correspond to the motion (a movement and a change in orientation) of the imaging unit 38 (information processing apparatus 3) in the real space, and updates the virtual camera data Df with the changed position and orientation.

Next, the control unit 31 performs an image overlaying process (step S146), and proceeds to the next step. It should be noted that the image overlaying process in step S146 is similar to that in step S123, and will not herein described in detail.

Next, the control unit 31 determines whether or not to acquire a still image (step S147). For example, if the control unit 31 determines that the user's operation of acquiring a still image has been performed, based on data that has been acquired from the input unit 34 and is stored in the operation data Da, the result of the determination in step S147 is positive. If the control unit 31 determines to acquire a still image, the control unit 31 proceeds to step S148. Otherwise, i.e., if the control unit 31 does not determine to acquire a still image, the control unit 31 ends the subroutine.

In step S148, the control unit 31 performs a process of acquiring a still image, and ends the subroutine. For example, the control unit 31 temporarily converts an image being displayed on the display unit 35, i.e., the overlay image indicated by the overlay image data Dh, into a still image, and displays the still image on the display unit 35, and stores the still image into the storage unit 32.

Referring back to FIG. 14, in step S111, the control unit 31 performs a display control process of generating and displaying a display image on the display unit 35, and proceeds to the next step. For example, the control unit 31 adds an operation button image corresponding to the current state to the overlay image indicated by the overlay image data Dh to generate a display image, and displays the display image on the display unit 35.

Next, the control unit 31 determines whether or not to end the game process (step S112). A condition under which the game process is ended is, for example, that a condition for ending the game process is satisfied, that an operation for ending the game process has been performed by the user, etc. If the control unit 31 continues the game process, the control unit 31 returns to and repeats step S102. If the control unit 31 ends the game process, the control unit 31 ends the process of the flowchart.

Thus, in the information processing apparatus 3 performing the above-mentioned game process, even before a plane has been detected in a captured image of the real space, the player object PO can be overlaid and displayed on the captured image. Therefore, the response time that it takes to overlay and display the player object PO can be reduced.

Although in the above non-limiting example, the touch panel covering the display screen of the display unit 35 is used as a non-limiting example of the input unit 34 for detecting a touch operation, other devices such as a touch pad may be used. As a non-limiting example, in the case where a game system is used in which an operation is performed using a separate controller while viewing a game image displayed on a stationary monitor, a touch operation may be performed using a touch pad included in the controller.

Although in the foregoing, the player object PO is overlaid and displayed using a plane detected in a captured image of the real space, another characteristic portion may be detected in the captured image, and the player object PO may be overlaid and displayed based on that characteristic portion. For example, a predetermined marker placed in the real space (e.g., a marker placed on a plane) may be an object to be shot, and the marker may be detected in the captured image by performing image processing, such as pattern matching, on the captured image. In that case, the position of a player object PO to be overlaid on the captured image is controlled with reference to the marker such that, as a non-limiting example, the player object PO is overlaid and displayed so as to be disposed on the marker, or is overlaid and displayed at a position away from the marker with reference to the position of the marker. In this non-limiting example, even when the player object PO is displayed using the detected marker, the player object PO can be overlaid and displayed on the captured image before the marker has been detected in the captured image. It should be noted that the player object may be overlaid and displayed in a manner depending on the type of the marker detected in the captured image. The display direction of the player object may be controlled according to the direction of the marker.

In this non-limiting example, a plurality of planes may be detected in a single captured image. The plurality of planes may have the same or different heights and may have other shapes in addition to a rectangular shape in the real space.

In any case, in this non-limiting example, a virtual reference plane is set in the virtual space for each detected plane, and the player object PO can be disposed on any plane and overlaid and displayed. Planes detected in the captured image may include not only a horizontal plane but also sloped planes and vertical planes in the real space. No matter what kind of plane has been detected, the player object PO can be disposed along the plane by setting a virtual reference plane corresponding to the slope of the plane in the virtual space. Other three-dimensional shapes, letters, and the like may be detected as a characteristic portion in the captured image, and the player object PO may be overlaid and displayed based on the three-dimensional shapes, letters, or the like.

In the foregoing, a virtual object indicating the virtual reference plane in the virtual space is not set, and therefore, a virtual object corresponding to the plane is not displayed in an overlay image in which the virtual space image is overlaid. Although in this non-limiting example, the user can be notified of the position of the detected plane in the overlay image, by disposing the shadow object S on the virtual reference plane, a plane object indicating the entire virtual reference plane may be set and overlaid and displayed. In that case, a plane object indicating the entire plane detected in the captured image is overlaid and displayed.

The motion and orientation of the imaging unit 38 (information processing apparatus 3) may be calculated by any suitable technique. The imaging unit 38 (information processing apparatus 3) may be provided with a magnetic sensor or a gravity sensor as a sensor for calculating the motion and orientation of the imaging unit 38. In another non-limiting example, another apparatus may capture an image of the information processing apparatus 3 using an imaging device (e.g., a camera attached to a ceiling), and the captured image may be used to calculate the motion and orientation of the information processing apparatus 3.

Although the information processing system 1 includes the server 200 that can communicate with the information processing apparatus 3, the information processing apparatus 3 may perform the game process alone without connecting to the server 200. In particular, a racing game in which the user operates the player object PO can be executed without through the server 200, and therefore, can be carried out by an internal process of the information processing apparatus 3. In addition, even in a racing game in which a plurality of information processing apparatuses 3 participate, the game process may be carried out by communication between the information processing apparatuses 3 or between the information processing apparatuses 3 and other apparatuses without through the server 200. A portion of the process of performing a racing game according to the user's operation of the player object PO may be executed by the server 200. As a result, processes in a plurality of information processing apparatuses 3 can be managed by the server 200 in a centralized fashion.

In the foregoing, the information processes are performed in the information processing apparatus 3. Alternatively, at least a portion of the steps in the processes may be performed in another apparatus. For example, steps in the processes may be executed in cooperation with the server 200 or another apparatus (e.g., another server, another game apparatus, or another mobile terminal) that can communicate with the information processing apparatus 3. Thus, processes similar to the above processes can be performed by the server 200 or another apparatus performing a portion of the steps in the processes. The above processes may be executed by a single processor or a plurality of cooperating processors included in an information processing system including at least one information processing apparatus. In the above non-limiting example, the processes shown in the flowcharts are performed by the control unit 31 of the information processing apparatus 3 executing a predetermined program. Alternatively, all or a portion of the above processes may be performed by a dedicated circuit included in the information processing apparatus 3.

Here, according to the above non-limiting variation, this non-limiting example can be implanted in a so-called cloud computing system form or distributed wide-area or local-area network system form. For example, in the distributed local-area network system, the above processes can be executed by cooperation between a stationary information processing apparatus (stationary game apparatus) and a mobile information processing apparatus (handheld game apparatus). It should be noted that, in these system forms, each of the above steps may be performed by any suitable one of the apparatuses, and this non-limiting example may be implemented by assigning the steps to the apparatuses in any suitable manner.

The order of steps, setting values, conditions for determination, etc., used in the above information process are merely for illustrative purposes, and other order of steps, setting values, conditions for determination, etc., may be used to implement this non-limiting example.

The above information processing program may be supplied to the information processing apparatus 3 not only through an external storage medium, such as an external memory, but also through a wired or wireless communication line. The program may be previously stored in a non-volatile storage device in the information processing apparatus 3. Examples of an information storage medium storing the program may include non-volatile memories, and in addition, CD-ROMs, DVDs, optical disk-shaped storage media similar thereto, flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example embodiment and common technical knowledge. It should be understood throughout the present specification that expression of a singular form includes the concept of their plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example embodiment pertain. If there is any inconsistency or conflict, the present specification (including the definitions) shall prevail.

As described above, this non-limiting example is useful for, for example, information processing programs, information processing apparatuses, information processing systems, and information processing methods, etc., for the purpose of, for example, allowing reduction of the response time that it takes to overlay and display a virtual object on a captured image of a real space.

What is claimed is:

1. A non-transitory computer-readable storage medium having stored therein instructions that, when executed by a computer of an information processing apparatus, cause the information processing apparatus to perform operations comprising:
   detecting a shooting state including a position and an orientation of an imaging device that generates a captured image of a real space at update intervals;
   first updating a position and an orientation of at least one of a virtual reference plane and a virtual camera in a virtual space, based on detection of a characteristic portion in the captured image;
   second updating a position and an orientation of at least one of a virtual object and the virtual camera in the virtual space, based on the shooting state;
   generating an overlay image in which an image of the virtual object as viewed from the virtual camera is overlaid on the captured image, when the virtual object is in a field-of-view range of the virtual camera; and
   outputting the overlay image to a display device,
   wherein
   the second updating includes
       controlling the position and orientation of at least one of the virtual camera and the virtual object such that the virtual object is in the field-of-view range of the virtual camera, before the detection of the characteristic portion,
       updating the position of at least one of the virtual object, the virtual reference plane, and the virtual camera such that the virtual object is along the virtual reference plane, based on the shooting state, after the detection of the characteristic portion, and
       updating the position and orientation of at least one of the virtual object, the virtual reference plane, and the virtual camera such that an appearance of the virtual object as viewed from the virtual camera based on relative orientations and relative positions of the virtual camera and the virtual object is in association with the shooting state, no matter whether or not the characteristic portion has been detected, when a position fixation condition is satisfied.

2. The non-transitory computer-readable storage medium according to claim 1, wherein
   the first updating includes updating the position and orientation of at least one of the virtual reference plane and the virtual camera, based on the detection of the characteristic portion indicating a plane in the real space in the captured image, such that a position and an orientation of the plane correspond to the position and orientation of the virtual reference plane in the overlay image.

3. The non-transitory computer-readable storage medium according to claim 1, wherein
   the second updating includes updating the orientation of at least one of the virtual object and the virtual camera, according to the orientation of the imaging device, before the detection of the characteristic portion.

4. The non-transitory computer-readable storage medium according to claim 1, wherein
   the second updating includes disposing a shadow object indicating a shadow of the virtual object on the virtual reference plane, after the detection of the characteristic portion.

5. The non-transitory computer-readable storage medium according to claim 1, wherein
   the second updating includes, when the position fixation condition is satisfied, updating the position of at least one of the virtual object and the virtual camera, in response to changing of the position of the imaging device by a first change amount, such that relative positions of the virtual camera and the virtual object are changed by a second change amount proportional to the first change amount, no matter whether or not the characteristic portion has been detected.

6. The non-transitory computer-readable storage medium according to claim 1, wherein
   the second updating includes, when the position fixation condition is satisfied, updating the orientation of at least one of the virtual object and the virtual camera, in response to changing of the orientation of the imaging device by a third change amount, such that a relative direction between a direction of the orientation of the virtual camera and a direction from the virtual camera to the virtual object is changed by a third change amount, no matter whether or not the characteristic portion has been detected.

7. The non-transitory computer-readable storage medium according to claim 1, wherein
   in the second updating, display forms of the virtual object before and after the position fixation condition is satisfied are different from each other.

8. The non-transitory computer-readable storage medium according to claim 1, wherein
   in the second updating, display forms of the virtual object before and after the detection of the characteristic portion are different from each other.

9. The non-transitory computer-readable storage medium according to claim 1, wherein
   the instructions cause the computer to perform further operations comprising:
       changing an action of the virtual object according to a first instruction input of a user.

10. The non-transitory computer-readable storage medium according to claim 1, wherein
    the second updating includes turning the virtual object around an axis perpendicular to the virtual reference plane, or turning the virtual camera around an axis passing through the position of the virtual object and extending perpendicularly to the virtual reference plane, according to a second instruction input of a user, after the position fixation condition is satisfied.

11. The non-transitory computer-readable storage medium according to claim 1, wherein
    the first updating includes updating the position and orientation of the virtual camera, based on the detection of the characteristic portion in the captured image, and
    the second updating includes, when the position fixation condition is satisfied, updating the position and orientation of the virtual camera such that the position and orientation of the virtual camera are in association with the shooting state, no matter whether or not the characteristic portion has been detected.

12. An information processing apparatus comprising a computer configured to control the information processing apparatus to at least:

detect a shooting state including a position and an orientation of an imaging device that generates a captured image of a real space at update intervals;

first update a position and an orientation of at least one of a virtual reference plane and a virtual camera in a virtual space, based on detection of a characteristic portion in the captured image;

second update a position and an orientation of at least one of a virtual object and the virtual camera in the virtual space, based on the shooting state;

generate an overlay image in which an image of the virtual object as viewed from the virtual camera is overlaid on the captured image, when the virtual object is in a field-of-view range of the virtual camera; and output the overlay image to a display device, wherein the second updating includes controlling the position and orientation of at least one of the virtual camera and the virtual object such that the virtual object is in the field-of-view range of the virtual camera, before the detection of the characteristic portion, updating the position of at least one of the virtual object, the virtual reference plane, and the virtual camera such that the virtual object is along the virtual reference plane, based on the shooting state, after the detection of the characteristic portion, and updating the position and orientation of at least one of the virtual object, the virtual reference plane, and the virtual camera such that an appearance of the virtual object as viewed from the virtual camera based on relative orientations and relative positions of the virtual camera and the virtual object is in association with the shooting state, no matter whether or not the characteristic portion has been detected, when a position fixation condition is satisfied.

13. An information processing system comprising a computer configured to control the information processing system to at least:

detect a shooting state including a position and an orientation of an imaging device that generates a captured image of a real space at update intervals;

first update a position and an orientation of at least one of a virtual reference plane and a virtual camera in a virtual space, based on detection of a characteristic portion in the captured image;

second update a position and an orientation of at least one of a virtual object and the virtual camera in the virtual space, based on the shooting state;

generate an overlay image in which an image of the virtual object as viewed from the virtual camera is overlaid on the captured image, when the virtual object is in a field-of-view range of the virtual camera; and output the overlay image to a display device, wherein the second updating includes controlling the position and orientation of at least one of the virtual camera and the virtual object such that the virtual object is in the field-of-view range of the virtual camera, before the detection of the characteristic portion, updating the position of at least one of the virtual object, the virtual reference plane, and the virtual camera such that the virtual object is along the virtual reference plane, based on the shooting state, after the detection of the characteristic portion, and updating the position and orientation of at least one of the virtual object, the virtual reference plane, and the virtual camera such that an appearance of the virtual object as viewed from the virtual camera based on relative orientations and relative positions of the virtual camera and the virtual object is in association with the shooting state, no matter whether or not the characteristic portion has been detected, when a position fixation condition is satisfied.

14. An information processing method comprising:

detecting a shooting state including a position and an orientation of an imaging device that generates a captured image of a real space at update intervals;

first updating a position and an orientation of at least one of a virtual reference plane and a virtual camera in a virtual space, based on detection of a characteristic portion in the captured image;

second updating a position and an orientation of at least one of a virtual object and the virtual camera in the virtual space, based on the shooting state;

generating an overlay image in which an image of the virtual object as viewed from the virtual camera is overlaid on the captured image, when the virtual object is in a field-of-view range of the virtual camera; and outputting the overlay image to a display device, wherein the second updating includes controlling the position and orientation of at least one of the virtual camera and the virtual object such that the virtual object is in the field-of-view range of the virtual camera, before the detection of the characteristic portion, updating the position of at least one of the virtual object, the virtual reference plane, and the virtual camera such that the virtual object is along the virtual reference plane, based on the shooting state, after the detection of the characteristic portion, and updating the position and orientation of at least one of the virtual object, the virtual reference plane, and the virtual camera such that an appearance of the virtual object as viewed from the virtual camera based on relative orientations and relative positions of the virtual camera and the virtual object is in association with the shooting state, no matter whether or not the characteristic portion has been detected, when a position fixation condition is satisfied.

* * * * *